United States Patent
Yanagida et al.

(10) Patent No.: US 11,608,068 B2
(45) Date of Patent: Mar. 21, 2023

(54) DRIVE FORCE CONTROL APPARATUS

(71) Applicant: HONDA MOTOR CO., LTD., Tokyo (JP)

(72) Inventors: Hisanori Yanagida, Wako (JP); Kwangwoo Seo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 225 days.

(21) Appl. No.: 17/198,930

(22) Filed: Mar. 11, 2021

(65) Prior Publication Data

US 2021/0284168 A1    Sep. 16, 2021

(30) Foreign Application Priority Data

Mar. 13, 2020 (JP) .............................. JP2020-044178

(51) Int. Cl.
| | | |
|---|---|---|
| *B60W 30/18* | (2012.01) | |
| *B60W 50/02* | (2012.01) | |
| *B60W 50/035* | (2012.01) | |

(52) U.S. Cl.
CPC .. *B60W 30/18172* (2013.01); *B60W 50/0205* (2013.01); *B60W 50/035* (2013.01); *B60W 2520/10* (2013.01); *B60W 2520/28* (2013.01); *B60W 2540/10* (2013.01); *B60W 2710/06* (2013.01); *B60W 2710/08* (2013.01)

(58) Field of Classification Search
CPC ....... B60W 30/18172; B60W 50/0205; B60W 50/035; B60W 2520/10; B60W 2520/28; B60W 2540/10; B60W 2710/06; B60W 2710/08; B60W 30/025; B60W 2720/106; B60W 50/10; B60W 30/02; B60W 10/06; B60W 10/119; B60W 30/18009; Y02T 10/72

See application file for complete search history.

(56) References Cited

U.S. PATENT DOCUMENTS

| | | | |
|---|---|---|---|
| 10,391,884 B2 * | 8/2019 | Iwahana | B60L 15/20 |
| 2001/0029423 A1 * | 10/2001 | Nishida | B60K 23/0808 |
| | | | 180/197 |
| 2014/0121929 A1 | 5/2014 | Murofushi | |
| 2018/0056811 A1 * | 3/2018 | Iwahana | H02P 23/30 |

FOREIGN PATENT DOCUMENTS

| | | |
|---|---|---|
| JP | 2008-081118 A | 4/2008 |
| JP | 2008-296618 A | 12/2008 |
| JP | 2014-084018 A | 5/2014 |
| JP | 2016-070228 A | 5/2016 |

* cited by examiner

*Primary Examiner* — Jason Holloway

(74) *Attorney, Agent, or Firm* — Carrier Shende & Associates, P.C.; Joseph P. Carrier; Fulchand P. Shende

(57) ABSTRACT

A drive force control apparatus includes a drive force control section that has a steady drive force, a filtered drive force obtained by performing a filtering process on the steady drive force, and an internal drive force, which is calculated from a traction requested drive force, input thereto, and sets a target drive force based on the steady drive force, the filtered drive force, and the internal drive force. The drive force control section implements post-operation processing after control for causing the internal drive force to be the target drive force ends. In the post-operation processing, a new internal drive force, which is calculated based on a large-small relationship among the steady drive force, the filtered drive force, and the previously calculated internal drive force, is set as the target drive force.

9 Claims, 14 Drawing Sheets

DRIVE FORCE CONTROL APPARATUS

CROSS-REFERENCE TO RELATED APPLICATION

This application is based upon and claims the benefit of priority from Japanese Patent Application No. 2020-044178 filed on Mar. 13, 2020, the contents of which are incorporated herein by reference.

BACKGROUND OF THE INVENTION

Field of the Invention

The present invention relates to a drive force control apparatus that adjusts a drive force of a vehicle.

Description of the Related Art

A drive force control apparatus is loaded in a vehicle such as a four-wheel automobile, and adjusts the actual drive force based on a requested drive force from a driver or an automated travel apparatus (ACC: Adaptive Cruise Control or the like, for example) during normal travel or on a normal target drive force obtained by performing a filtering process on the requested drive force.

Furthermore, as shown in Japanese Laid-Open Patent Publication No. 2016-070228, a system that performs behavior stabilization control (so-called ESC: Electronic Stability Control) to stabilize the behavior when slipping occurs is loaded in a vehicle. As an example, with the behavior stabilization control, when slipping occurs during acceleration or the like, traction control (drive force reduction control) is implemented to reduce the drive force of the engine or motor to a prescribed value. On the other hand, when slipping occurs during deceleration or the like, engine drag torque control (drive force increase control) is implemented to increase the drive force of the engine or motor to a prescribed value. In the following description, control realized by the operation of the traction control or the engine drag control is referred to collectively as a traction control system.

In the operation of the traction control system, the drive force control apparatus receives a traction requested drive force from the system, and adjusts the drive force of the vehicle by switching from a target drive force based on the requested drive force described above to a target drive force based on this traction requested drive force.

SUMMARY OF THE INVENTION

When switching to normal control after the operation of the traction control system ends, the drive force control apparatus switches from the target drive force that is based on the traction requested drive force to the target drive force that is based on the requested drive force for normal control. When this happens, the drive force of the vehicle differs due to situations such as the velocity of the vehicle and a slipping state, and these situations cause a large difference between the drive forces. When a large drive force difference occurs, the actual drive force is not switched to smoothly when control switching occurs, and this causes a disturbance in the behavior of the vehicle.

Here, in order to smooth out the drive force difference, there is an idea for the drive force control apparatus to set control content for each of a variety of situations. However, in such a case, the drive force control apparatus becomes larger and the computational load of the drive force control apparatus increases. In particular, since the normal target drive force experiences an innate delay relative to the requested drive force due to the filtering process, there is the possibility that any further computational delay will affect the behavior stabilization of the vehicle.

The present invention has been devised taking into consideration the aforementioned problem, and has the object of providing a drive force control apparatus that, by adjusting the drive force after operation of the traction control ends using a simple configuration, can suppress the computational load, reduce the cost, and suppress disturbances in the behavior of the vehicle.

In order to achieve the aforementioned object, a drive force control apparatus according to a first aspect of the present invention includes a first drive force setting section that sets a first drive force based on manipulation of an acceleration pedal or a requested drive force of an automated travel apparatus; a second drive force setting section that sets a second drive force obtained by performing a filtering process on the first drive force; and a drive force control section that has the first drive force and the second drive force input thereto, and sets a target drive force, wherein the drive force control section: has a traction requested drive force, which is a drive force requested by a traction control system, input thereto, and during operation of the traction control system, calculates a third drive force based on the traction requested drive force and sets the third drive force as the target drive force; implements post-operation processing after operation of the traction control system ends; and in the post-operation processing, calculates a new third drive force based on a large-small relationship among the first drive force, the second drive force, and the previously calculated third drive force, and sets the new third drive force as the target drive force.

Furthermore, in order to achieve the aforementioned object, a drive force control apparatus according to a second aspect of the present invention includes a drive force control section that has a first drive force, a second drive force obtained by performing a filtering process on the first drive force, and a third drive force, which is calculated from a drive force requested based on a travel state, input thereto, and sets a target drive force based on the first drive force, the second drive force, and the third drive force, wherein the drive force control section implements post-operation processing after control for causing the third drive force to be the target drive force ends; and in the post-operation processing, a new third drive force is calculated based on a large-small relationship among the first drive force, the second drive force, and the previously calculated third drive force, and the new third drive force is set as the target drive force.

The drive force control apparatuses described above can, by adjusting the drive force after the operational end of the traction control system using a simple configuration, can suppress the computational load, reduce the cost, and suppress disturbances in the behavior of the vehicle.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of the present invention will be presented and described below, with reference to the accompanying drawings.

Figure 1:
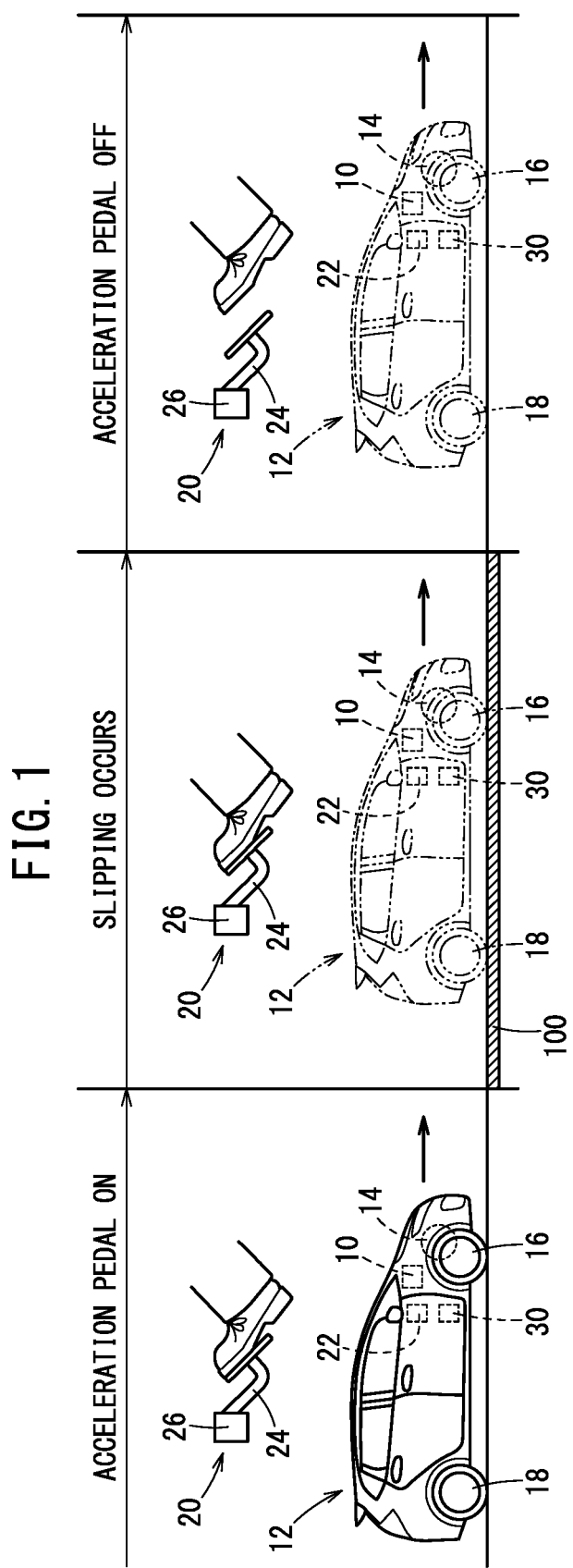
FIG. 1 is a descriptive diagram showing an operation of a vehicle in which a drive force control apparatus according to an embodiment of the present invention is loaded.

As shown in FIG. 1, a drive force control apparatus 10 according to an embodiment of the present invention is an apparatus (engine control apparatus, power train apparatus, and the like) that is loaded in a vehicle 12 such as a four-wheel automobile and adjusts the drive force during travel of the vehicle 12. The "drive force" referred to in this Specification is a concept encompassing acceleration, acceleration torque, drive source torque, and the like that are physical quantities relating to drive force. The drive force control apparatus 10 according to the present invention is not limited to being used in a four-wheel automobile, and can be used in a vehicle 12 with two or more wheel by applying suitable modifications thereto.

The vehicle 12 includes a drive source 14 such as an engine or motor, driving wheels 16 that rotate by having rotational driving force transmitted from the drive source 14, and driven wheels 18 that rotate by following the driving wheels 16. The driving wheels 16 may be either the front wheels or the rear wheels of the vehicle 12. Alternatively, the drive force control apparatus 10 may be applied to a four-wheel drive vehicle in which the rotational drive force of the drive source 14 is transmitted to both the front wheels and the rear wheels.

A manipulation apparatus 20 enabling the driver to manipulate the drive force of the vehicle 12 and an automated travel apparatus 22 that automatically manipulates the drive force of the vehicle 12 are provided inside the vehicle 12. The manipulation apparatus 20 and the automated travel apparatus 22 are switched between to serve as the main apparatus by a process or manipulation made by the driver during travel of the vehicle 12, and the main apparatus outputs the requested drive force RD to the drive force control apparatus 10. It should be noted that the vehicle 12 only needs to have a structure in which the vehicle 12 makes a request for drive force for travel to the drive force control apparatus 10, and may have a configuration including only one of the manipulation apparatus 20 and the automated travel apparatus 22, for example.

The manipulation apparatus 20 includes an acceleration pedal 24 enabling the driver to manipulate the vehicle velocity and acceleration, and a transmission apparatus 26 that detects a stepping amount (accelerator opening amount) of the acceleration pedal 24 and transmits to the drive force control apparatus 10 the requested drive force RD that corresponds to this accelerator opening amount. Furthermore, although not shown in the drawings, the manipulation apparatus 20 includes a brake pedal apparatus enabling the driver to manipulate braking, a paddle shift (shift lever) apparatus for changing gears (changing velocity), and the like.

The automated travel apparatus 22 is formed by a camera that captures images outside of the vehicle 12, a plurality of types of sensors that detect the travel state of the vehicle 12, a control apparatus, and the like (none of which are shown in the drawings). The control apparatus is formed by a computer (ECU: Electronic Control Unit) that includes a processor, a memory, an input/output interface, and the like (none of which are shown in the drawings). As an example, an ACC apparatus that adjusts the acceleration and deceleration based on a velocity set by the driver or a speed limit on the road being travelled or adjusts the acceleration and deceleration in a manner to track another vehicle travelling in front of the vehicle 12 is used as the automated travel apparatus 22. Alternatively, the automated travel apparatus 22 may be an apparatus that performs automated driving to control the overall travel of the vehicle 12 including steering of the vehicle 12. When driving assistance or automated driving is implemented, the automated travel apparatus 22 transmits the requested drive force RD corresponding to the driving situation to the drive force control apparatus 10.

Figure 2:
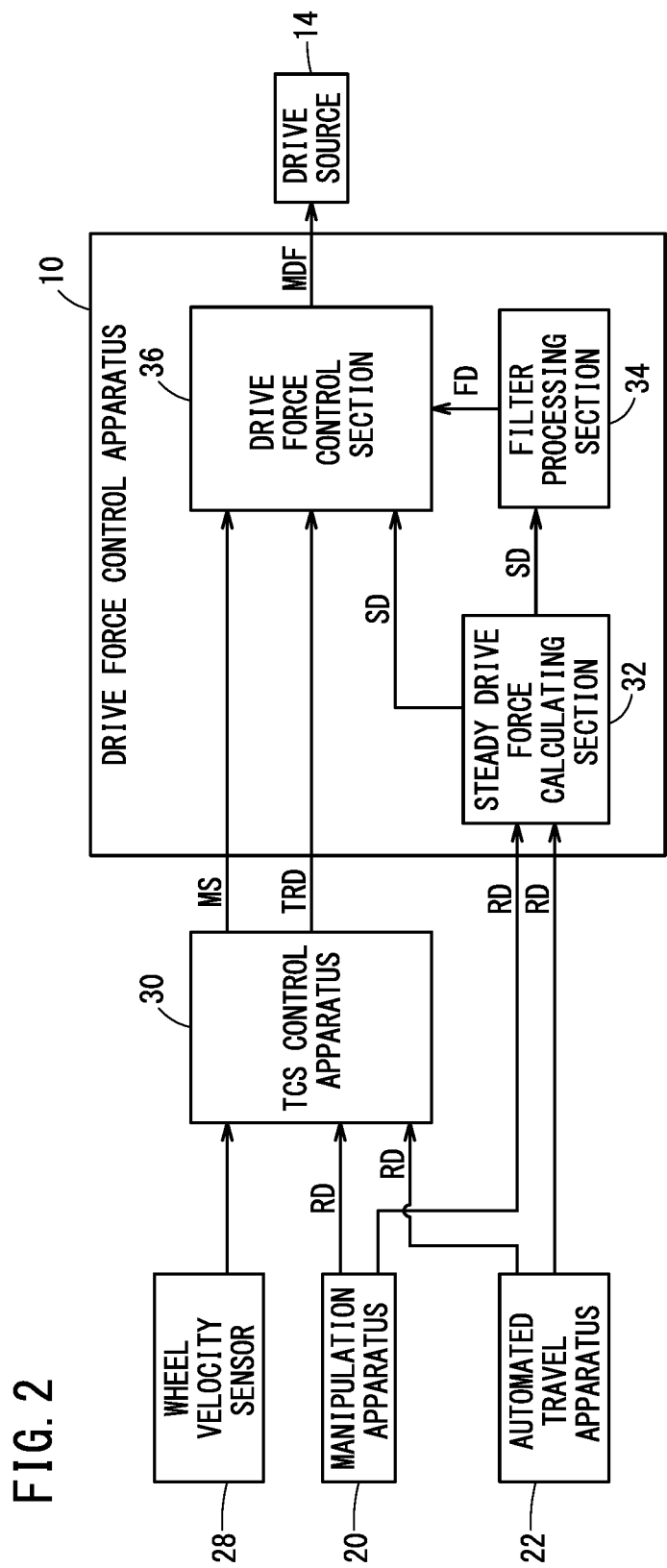
FIG. 2 is a block diagram showing configurations of a TCS control apparatus and the drive force control apparatus.

As shown in FIGS. 1 and 2, the vehicle 12 according to the present embodiment implements the traction control system (ESC: Electronic Stabilization Control) to stabilize the behavior of the vehicle 12, when slipping or the like occurs in the vehicle 12. Therefore, a plurality of wheel velocity sensors 28 that respectively detect the rotational velocity of the driving wheels 16 and the rotational velocity of the driven wheels 18 of the vehicle 12 and a control apparatus (referred to below as a TCS control apparatus 30) that receives the detection signals of each wheel velocity sensor 28 and performs processing are provided inside the vehicle 12.

The TCS control apparatus 30 is formed by a computer (ECU) that includes one or more processors, a memory, an input/output interface, and the like (none of which are shown in the drawings). The TCS control apparatus 30 judges whether slipping of the vehicle 12 has occurred, based on a difference between the rotational velocity of the driving wheels 16 and the vehicle velocity. The vehicle velocity can be calculated using the rotational velocity of the driven wheels 18 (the rotational velocity of each of the four wheels in the case of a four-wheel drive vehicle), the acceleration, the steering angle, the yaw rate, front-rear acceleration, lateral acceleration, drive force, braking force, and the like.

Furthermore, the occurrence of slipping may be estimated based on the rotational velocity of the driving wheels 16, the vehicle velocity, the acceleration, and the like. The following describes a representative configuration in which the rotational velocity of the driven wheels 18 is used as the vehicle velocity. When slipping is judged to have occurred, the TCS control apparatus 30 implements the traction control system. In order to facilitate understanding of the present invention, the following describes several examples of the operation of the TCS control apparatus 30.

As an example, in a case where the road being travelled on is a dangerous road 100 (wet, snowy, icy, or the like), the vehicle 12 experiences slipping due to the rotational drive force or braking force exceeding the adhesion limit of the wheels. When slipping occurs, a situation is caused in which the rotational velocity of the driving wheels 16 and the rotational velocity of the driven wheels 18 do not match (see FIG. 4 as well).

When slipping occurs in which the rotational velocity of the driving wheels 16 is greater than the rotational velocity of the driven wheels 18 during acceleration of the vehicle 12, the TCS control apparatus 30 performs traction control (drive force reduction control) to reduce the rotational velocity of the driving wheels 16. In this case, the TCS control apparatus 30 transmits a traction requested drive force TRD, which is a drive force value lower than the requested drive force RD of the manipulation apparatus 20 or the automated travel apparatus 22, to the drive force control apparatus 10. This traction requested drive force TRD is calculated based on the requested drive force RD of the manipulation apparatus 20 or the automated travel apparatus 22, the vehicle velocity estimated from the rotational velocity of the driving wheels 16 or the rotational velocity of the driven wheels 18, and the like.

When slipping occurs in which the rotational velocity of the driving wheels 16 is less than the rotational velocity of the driven wheels 18 during deceleration of the vehicle 12, the TCS control apparatus 30 performs engine drag control (EDC) (drive force increase control) to increase the rotational velocity of the driving wheels 16. In this Specification, the drive force increase control is referred to as engine drag control, but this engine drag control obviously also includes control to increase the rotational velocity of the driving wheels 16 with a motor in a case where a motor is used as the drive source 14. In this case, the TCS control apparatus 30 transmits the traction requested drive force TRD, which is a value higher than the requested drive force RD of the manipulation apparatus 20 or the automated travel apparatus 22, to the drive force control apparatus 10. This traction requested drive force is also calculated based on the requested drive force RD of the manipulation apparatus 20 or the automated travel apparatus 22, the vehicle velocity estimated from the rotational velocity of the driving wheels 16 or the rotational velocity of the driven wheels 18, and the like.

The TCS control apparatus 30 is not limited to having a configuration that performs only the behavior stabilization control described above. For example, the TCS control apparatus 30 may be configured to be capable of implementing an anti-lock braking system (ABS) to reduce slipping caused by locking of the wheels during braking, as another type of behavior stabilization control.

The drive force control apparatus 10 is formed by a computer (ECU) that includes one or more processors, a memory, an input/output interface, and the like (none of which are shown in the drawings). The drive force control apparatus 10 receives and processes the requested drive force RD of the manipulation apparatus 20 or the automated travel apparatus 22, and outputs a control signal (control pulse, CAN communication signal, or the like) for controlling the rotational drive force of the drive source 14. The control signal includes information concerning the final drive force (referred to below as the target drive force MDF) to be provided as instructions to the drive source 14.

Essentially, the drive source 14 performs drive control (control such as throttling or igniting the engine, supplying power to the motor, or supplying hydrogen in a fuel cell automobile) according to the received control signal, and outputs the rotational drive force to be transmitted to the driving wheels 16.

The drive force control apparatus 10 creates function blocks such as shown in FIG. 2, by having the one or more processors execute a program (not shown in the drawings) stored in the memory, in order to generate the target drive force MDF. Specifically, a steady drive force calculating section 32, a filter processing section 34, and a drive force control section 36 are created within the drive force control apparatus 10.

Upon receiving the requested drive force RD from the manipulation apparatus 20 or the automated travel apparatus 22, the steady drive force calculating section 32 calculates and outputs a steady drive force SD (first drive force) corresponding to the requested drive force RD. For example, the steady drive force calculating section 32 performs a suitable correction (such as eliminating noise, vibration, overshoot, and undershoot, for example) on the requested drive force RD. As a result, the steady drive force SD becomes information that correlates with the requested drive force RD and can be used in the internal processing of the drive force control apparatus 10.

The filter processing section 34 outputs a drive force that has undergone the filtering process (second drive force, which is referred to below as the filtered drive force FD), by applying a suitable filtering process to the steady drive force SD calculated by the steady drive force calculating section 32. For example, in a case where the steady drive force SD (requested drive force RD) changes suddenly, the filter processing section 34 applies a time constant causing the drive force to change smoothly and gradually according to the travel capability of the vehicle 12 (see FIG. 4 as well). As a result, the filtered drive force FD can suppress sudden fluctuation of the drive force of the drive source 14 during a transitory period of the steady drive force SD, and smooth the travel of the vehicle 12.

The drive force control section 36 receives the steady drive force SD and the filtered drive force FD as input, and generates and outputs the target drive force MDF of the drive force control apparatus 10 based on these pieces of information. During normal travel in which slipping of the vehicle 12 does not occur (i.e. when the traction control system is not operating), the drive force control section 36 basically outputs the filtered drive force FD resulting from the processing by the filter processing section 34 as the target drive force MDF. In order to increase the responsiveness of manipulation of the manipulation apparatus 20 by the driver, the drive force control section 36 may output the steady drive force SD as the target drive force MDF during normal travel.

The drive force control apparatus 10 according to the present embodiment performs the control corresponding to the traction control system from the control during normal travel, by receiving information concerning the traction control system of the TCS control apparatus 30. The drive force control section 36 has implementation content (traction control for slipping during acceleration or engine drag control for slipping during deceleration) and the traction requested drive force TRD input thereto, as the information concerning the traction control system.

Essentially, with the traction control system, a plurality of types of drive forces (the steady drive force SD, the filtered drive force FD, and the traction requested drive force TRD)

are input to the drive force control section 36. Therefore, the drive force control section 36 performs processing to calculate an internal drive force ID (third drive force) that is unified to be processed within the drive force control apparatus 10. Then, during implementation of the traction control system, the drive force control section 36 calculates the internal drive force ID based on the traction requested drive force TRD and outputs this internal drive force ID to the outside as the target drive force MDF. As a result, the drive source 14 of the vehicle 12 can adjust the drive force to correspond to the traction requested drive force TRD (internal drive force ID) and quickly recover from the slipping.

It should be noted that, during implementation of the traction control system, there is a possibility of the traction requested drive force TRD (internal drive force ID) changing (deviating) significantly relative to the requested drive force RD (steady drive force SD or filtered drive force FD). In such a case, when control during normal travel is returned to after the traction control, there is a possibility of the behavior of the vehicle 12 deviating from the expectation of the driver, when returning from the traction requested drive force TRD to the filtered drive force FD (drive force based on the requested drive force RD), due to the difference between drive forces. For example, there are cases where, despite being in a situation where the driver performs an OFF manipulation on the acceleration pedal 24, the target drive force MDF increases in defiance of the OFF manipulation of the acceleration pedal 24 due to returning to the filtered drive force FD from the traction requested drive force TRD. When such an increase or decrease in the drive force differing from the content of the manipulation occurs, this leads to a disturbance in the behavior of the vehicle 12.

Alternatively, when transitioning to the control for normal travel after the implementation of the traction control system, there is considered to be a possibility of the target drive force MDF being undesirably adjusted to zero based on the OFF manipulation of the acceleration pedal 24 performed by the driver. However, in such a case, there is a concern that the driver would experience discomfort due to the feeling of deceleration received from the vehicle 12 being quickly lost.

Therefore, the drive force control apparatus 10 according to the present embodiment suppresses the disturbance in the behavior of the vehicle 12 and the discomfort felt by the driver by implementing post-operation processing after the implementation of the traction control system. When this post-operation processing is implemented, the drive force control section 36 generates the target drive force MDF by performing a process to determine the plurality of types of drive forces that have been acquired. The following is a detailed description of the processing performed by the drive force control section 36 during implementation of the post-operation processing.

Figure 3:
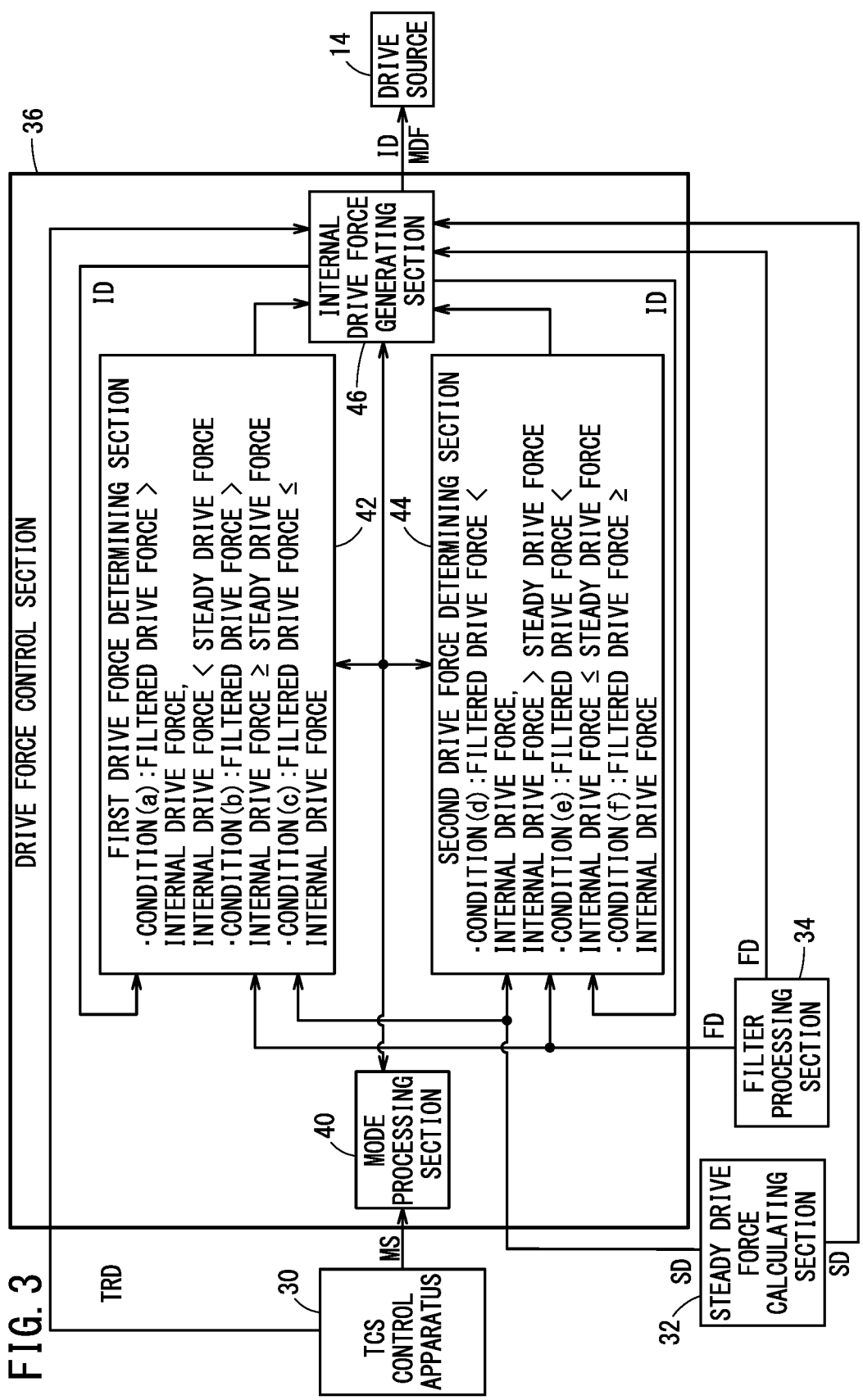
FIG. 3 is a block diagram showing a configuration of a drive force control section.

As shown in FIG. 3, a mode processing section 40, a first drive force determining section 42, a second drive force determining section 44, and an internal drive force generating section 46 are provided inside the drive force control section 36.

The mode processing section 40 receives a mode signal MS assigned to each type of implementation content (traction control for slipping during acceleration or engine drag control for slipping during deceleration) from the TCS control apparatus 30, as information of the traction control system. For example, the mode signal MS is set to [0] during normal control (or when stopped or malfunctioning), set to [1] when engine drag control is implemented, and set to [2] when traction control is implemented.

The mode processing section 40 monitors this mode signal MS and, when the mode signal MS switches from [0] to [2], issues operating instructions to the internal drive force generating section 46 to implement the traction control corresponding to the slipping during acceleration in the drive force control apparatus 10. Furthermore, when the mode signal MS switches from [0] to [1], the mode processing section 40 issues operating instructions to the internal drive force generating section 46 to implement the engine drag control corresponding to the slipping during deceleration in the drive force control apparatus 10.

The internal drive force generating section 46 operates according to the instructions of the mode processing section 40, to acquire the traction requested drive force TRD transmitted from the TCS control apparatus 30 and generate the internal drive force ID based on this traction requested drive force TRD. In the processing mode of the traction control corresponding to slipping during acceleration, the internal drive force generating section 46 generates the internal drive force ID to be a drive force value that is lower than the requested drive force RD, as described above. Furthermore, in the processing mode of the engine drag control corresponding to slipping during deceleration, the internal drive force generating section 46 generates the internal drive force ID to be a drive force value that is higher than the requested drive force RD, as described above. The internal drive force generating section 46 temporarily stores the generated internal drive force ID in a memory until a new internal drive force ID is calculated, or outputs the internal drive force ID as the normal target drive force MDF.

Figure 4:
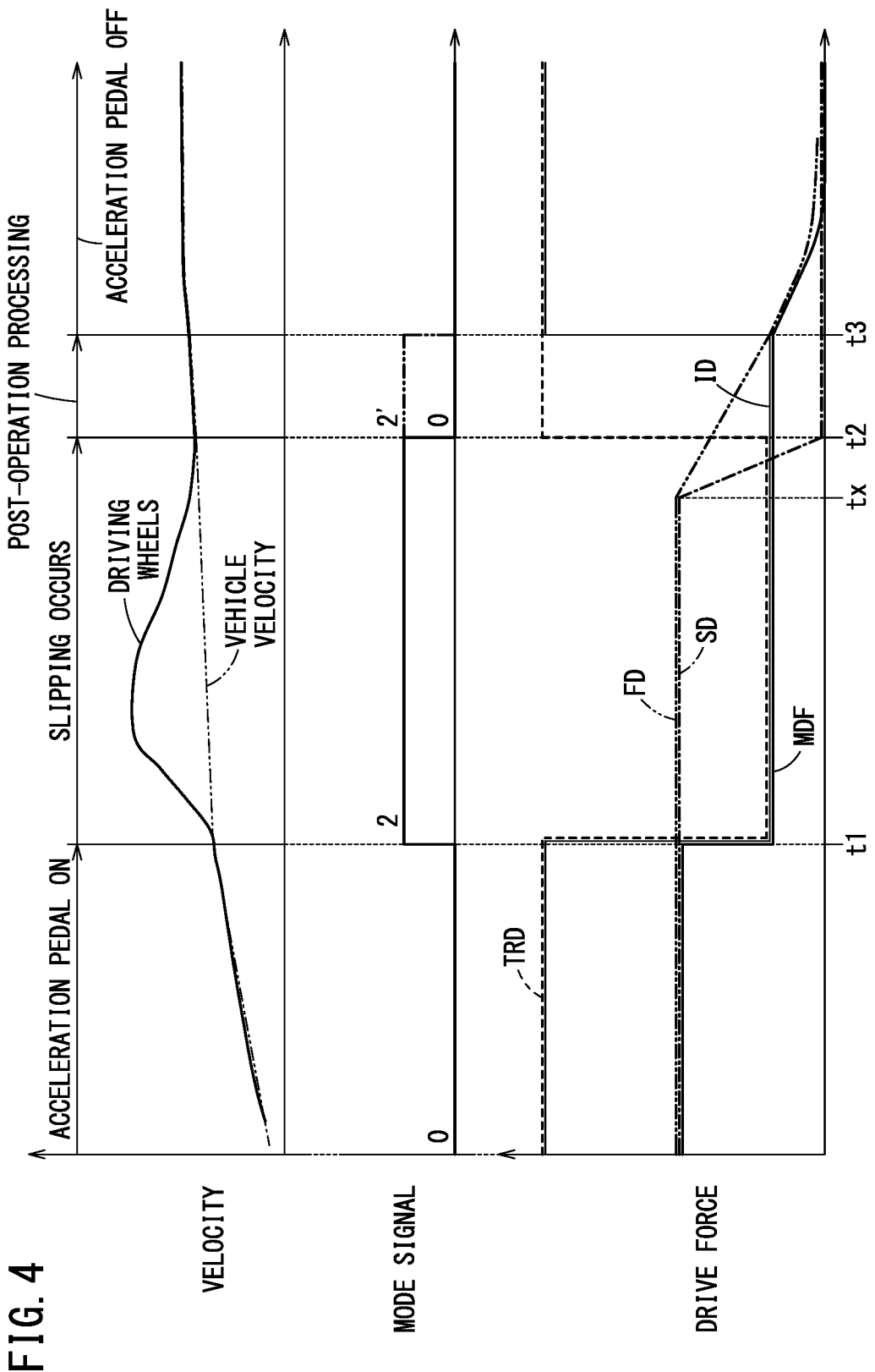
FIG. 4 is a time chart showing changes in control content and drive force in a first situation.
Figure 12:
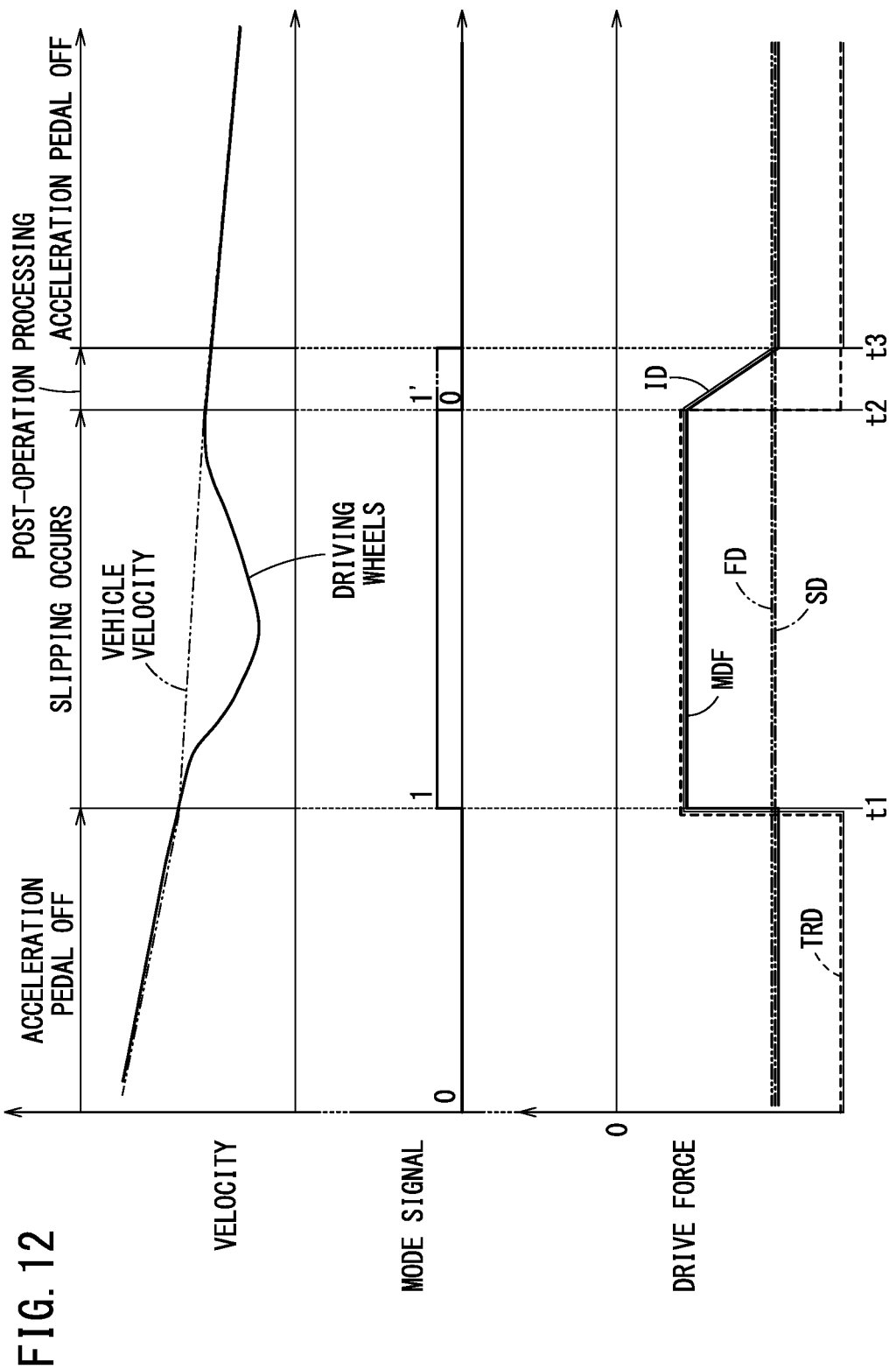
FIG. 12 is a time chart showing changes in control content and drive force in a ninth situation.

As shown in FIGS. 3, 4, and 12, the mode processing section 40 recognizes the operational end of the traction control system, based on the mode signal MS of the TCS control apparatus 30 falling from [1] or [2] to [0]. When this operational end occurs, the mode processing section 40 automatically transitions to the mode for performing the post-operation processing.

Then, if the traction control corresponding to the slipping during acceleration was implemented beforehand, the mode processing section 40 causes the first drive force determining section 42 to operate to perform the post-operation processing. In FIG. 4, the mode signal MS is in a state of having risen to [2'] as the post-operation processing, as shown by the two-dot chain line.

On the other hand, if the engine drag control corresponding to the slipping during deceleration was implemented beforehand, the mode processing section 40 causes the second drive force determining section 44 to operate to perform the post-operation processing. In FIG. 12, the mode signal MS is in a state of having risen to [1'] as the post-operation processing, as shown by the two-dot chain line.

The steady drive force SD of the steady drive force calculating section 32, the filtered drive force FD of the filter processing section 34, and the internal drive force ID calculated previously by the internal drive force generating section 46 are input to the first drive force determining section 42 that performs the post-operational processing after the traction control. The first drive force determining section 42 determines the policy for generating the new internal drive force ID by comparing the large-small relationship (relationship as to whether larger or smaller) among the drive force values of the steady drive force SD, the filtered drive force FD, and the previously calculated internal drive force ID. Specifically, the first drive force determining section 42 determines which conditions among conditions (a) to (c) shown below are established by the large-small relationship among the drive force values of the steady drive force SD, the filtered drive force FD, and the previously calculated internal drive force ID.

(a) filtered drive force FD>internal drive force ID, internal drive force ID<steady drive force SD (b) filtered drive force FD>internal drive force ID≥steady drive force SD (c) filtered drive force FD≤internal drive force ID The first drive force determining section 42 outputs a signal based on the conditions established among the above conditions (a) to (c) to the internal drive force generating section 46. Due to this, the internal drive force generating section 46 generates the internal drive force ID corresponding to each condition.

Similarly, the steady drive force SD of the steady drive force calculating section 32, the filtered drive force FD of the filter processing section 34, and the internal drive force ID calculated previously by the internal drive force generating section 46 are also input to the second drive force determining section 44 that performs the post-operational processing after the engine drag control. The second drive force determining section 44 determines the policy for generating the new internal drive force ID by comparing the large-small relationship among the drive force values of the steady drive force SD, the filtered drive force FD, and the previously calculated internal drive force ID. Specifically, the second drive force determining section 44 determines which conditions among conditions (d) to (f) shown below are established by the large-small relationship among the drive force values of the steady drive force SD, the filtered drive force FD, and the previously calculated internal drive force ID.

(d) filtered drive force FD<internal drive force ID, internal drive force ID<steady drive force SD (e) filtered drive force FD<internal drive force ID≤steady drive force SD (f) filtered drive force FD≥internal drive force ID The second drive force determining section 44 outputs a signal based on the conditions established among the above conditions (d) to (f) to the internal drive force generating section 46. Due to this, the internal drive force generating section 46 generates the internal drive force ID corresponding to each condition.

Specifically, when condition (a) or condition (d) is established, the internal drive force generating section 46 performs rate processing on the previously calculated internal drive force ID causing this internal drive force ID to gradually approach the filtered drive force FD. That is, when condition (a) is established, an internal drive force ID that has been increased according to the rate of change of the rate processing from the previously calculated internal drive force ID is newly calculated. Furthermore, when condition (d) is established, an internal drive force ID that has been decreased according to the rate of change of the rate processing from the previously calculated internal drive force ID is newly calculated.

As an example, the internal drive force generating section 46 holds in advance a rate of change for the rate processing corresponding to the travel capability of the vehicle 12, and calculates the new internal drive force ID based on this rate of change. It should be noted that the rate of change for the rate processing may fluctuate based on the difference between the filtered drive force FD and the internal drive force ID, the rate of change of the filtered drive force FD, and the like. For example, a configuration may be used whereby, in a case where there is a large difference between the filtered drive force FD and the internal drive force ID, the rate of change may be increased to more greatly change the internal drive force ID, and in a case where there is a small difference between the filtered drive force FD and the internal drive force ID, the rate of change may be decreased below that used in the case where the difference is large to more gradually change the internal drive force ID.

On the other hand, when condition (b) or condition (e) is established, the internal drive force generating section 46 calculates a new internal drive force ID by maintaining the previously calculated internal drive force ID. That is, in a case where the internal drive force ID is greater than or equal to the steady drive force SD after the operational end of the traction control, this can be said to be a state in which the requested drive force RD of the manipulation apparatus 20 or the automated travel apparatus 22 is sufficiently low. In this case, raising the internal drive force ID is meaningless, and lowering the internal drive force ID in accordance with the steady drive force SD has the possibility of making the driver uncomfortable as described above. Therefore, the internal drive force generating section 46 causes the vehicle 12 to behave in accordance with the intent of the driver by maintaining the internal drive force ID (target drive force MDF).

On the other hand, in a case where the internal drive force ID is less than or equal to the steady drive force SD after the operational end of the traction control, this can be said to be a state where the requested drive force RD of the manipulation apparatus 20 or the automated travel apparatus 22 has been increased. In this case, in the post-operation processing, there is no need to lower the internal drive force ID (decelerate), and raising the internal drive force ID suddenly in accordance with the steady drive force SD has the possibility of making the driver uncomfortable as described above. Therefore, the internal drive force generating section 46 tries to stabilize the behavior of the vehicle 12 by maintaining the internal drive force ID (target drive force MDF).

Furthermore, if condition (c) or condition (f) is established, drive force control section 36 performs a process to end the post-operation processing. That is, in a case where the internal drive force ID is greater than or equal to the filtered drive force FD after the operational end of the traction control, it can be said that this is a timing at which the target drive force MDF may be matched to the filtered drive force FD, and therefore this is used as a determination standard for ending the post-operation processing. In this case, the first drive force determining section 42 outputs a signal indicating establishment of condition (c) to the mode processing section 40, and the mode processing section 40 ends the post-operation processing based on the reception of this signal.

On the other hand, in a case where the internal drive force ID is less than or equal to the filtered drive force FD after the operational end of the engine drag control, it can be said that this is a timing at which the target drive force MDF may be matched to the filtered drive force FD, and therefore this is used as a determination standard for ending the post-operation processing. In this case, the second drive force determining section 44 outputs a signal indicating establishment of condition (f) to the mode processing section 40, and the mode processing section 40 ends the post-operation processing based on the reception of this signal.

Upon receiving indication of the end of the post-operation processing, the mode processing section 40 switches from the post-operation processing to the normal control, based on the [0] of the mode signal MS of the TCS control apparatus 30. Being switched to the normal control after the establishment of condition (c) or condition (f), the internal drive force generating section 46 switches from the internal drive force ID that was being used for the target drive force MDF up to this point to the filtered drive force FD, and outputs the filtered drive force FD as the target drive force MDF. As a result, the drive force control apparatus 10 is capable of smoothly changing the drive force when the transition from the post-operation processing to the normal travel control occurs.

The drive force control apparatus 10 according to the present embodiment is basically configured in the manner described above, and the following describes several situations envisioned in which slipping of the vehicle 12 occurs, as well as the control content and drive force change based on each situation. The following provides a detailed description of cases in which the driver of the vehicle 12 is manipulating the manipulation apparatus 20 (acceleration pedal 24).

[First Situation]

As shown in FIG. 4, before slipping occurs, the drive force control apparatus 10 receives [0] as the mode signal MS from the TCS control apparatus 30. In this case, the drive force control apparatus 10 outputs the filtered drive force FD that has been processed by the filter processing section 34, as the target drive force MDF of the drive source 14.

At the timing t1, when slipping has occurred during acceleration of the vehicle 12, the TCS control apparatus 30 outputs [2] as the mode signal MS for implementing the traction control to the drive force control apparatus 10. As described above, with the slipping during acceleration of the vehicle 12, the rotational velocity of the driving wheels 16 is greater than the rotational velocity of the driven wheels 18 (vehicle velocity).

At this time, along with receiving the mode signal MS, the drive force control apparatus 10 also receives the traction requested drive force TRD, which has a lower drive force value than the filtered drive force FD, from the TCS control apparatus 30. Based on this traction requested drive force TRD, the internal drive force generating section 46 calculates the internal drive force ID and implements the traction control to output this internal drive force ID as the target drive force MDF. Due to this, the vehicle 12 tries to quickly eliminate the slipping by suppressing the rotation of the driving wheels 16.

Here, in the first situation, a pattern is envisioned in which the driver has released the acceleration pedal 24 while the slipping is occurring (a timing tx somewhat earlier than the timing t2 at which the traction control ends) (see FIG. 1 as well). This first situation is also the most natural action for the driver to take when the vehicle 12 slips during acceleration. In this case, while the slipping is occurring, the drive force control apparatus 10 calculates a steady drive force SD (requested drive force RD) that gradually decreases and calculates a filtered drive force FD that gently decreases in accordance with this steady drive force SD.

After this, when the slipping of the vehicle 12 is eliminated at the timing t2, the TCS control apparatus 30 outputs [0] as the mode signal MS at the operational end of the traction control to the drive force control apparatus 10. The drive force control apparatus 10 transitions from the traction control implementation mode to the post-operation processing, based on the mode signal MS falling from [2] to [0]. In the first situation, at this timing t2, the steady drive force SD is lower than the internal drive force ID, and the filtered drive force FD is higher than the internal drive force ID.

Therefore, upon comparing the values of the steady drive force SD, the filtered drive force FD, and the internal drive force ID at the initial stage of the timing t2, the drive force control apparatus 10 determines that condition (b) described above is established. Accordingly, the drive force control apparatus 10 performs processing to maintain the internal drive force ID that was calculated during the traction control operation. In other words, the drive force control apparatus 10 outputs the same internal drive force ID as at the operational end of the traction control, as the target drive force MDF.

Due to the driver performing the OFF manipulation of the acceleration pedal 24, the internal drive force ID continues to be maintained until the internal drive force ID matches the gradually decreasing filtered drive force FD. At the timing t3 at which the internal drive force ID and the filtered drive force FD become matching, the drive force control apparatus 10 determines that condition (c) described above is established.

Accordingly, at this timing t3, the drive force control apparatus 10 ends the post-operation processing and transitions to the normal travel control. That is, the target drive force MDF is switched to the filtered drive force FD that gradually decreases from the internal drive force ID, and the vehicle 12 decelerates according to the filtered drive force FD.

In other words, the target drive force MDF does not immediately return (increase) to the filtered drive force FD when the traction control operation ends. Accordingly, the drive force control apparatus 10 can smoothly reduce the drive force of the vehicle 12 and avoid disturbances in the behavior of the vehicle 12.

[Second Situation]

Figure 5:
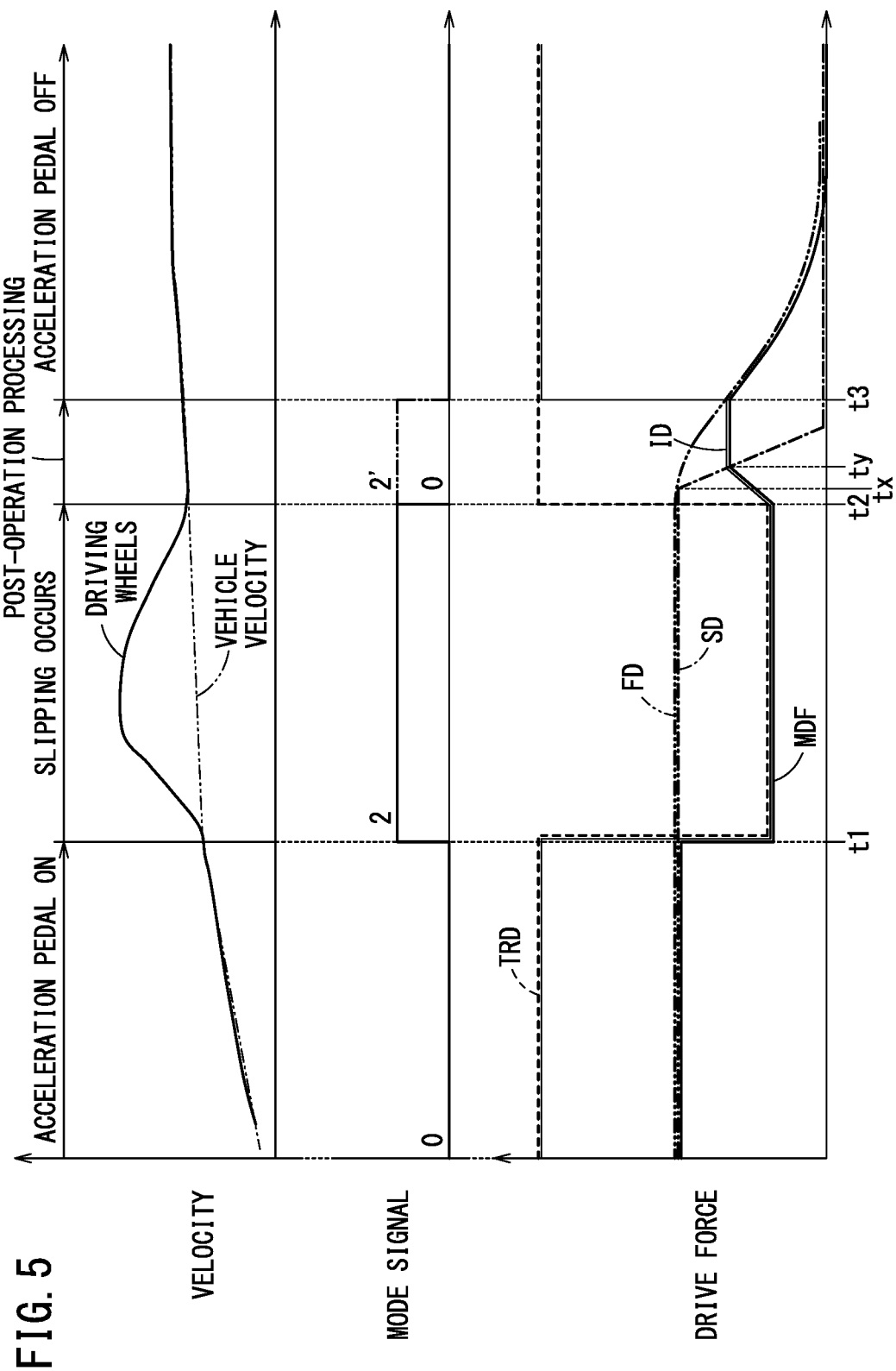
FIG. 5 is a time chart showing changes in control content and drive force in a second situation.

In the second situation, as shown in FIG. 5, a pattern is envisioned in which the driver releases the acceleration pedal 24 after slipping occurs (the timing tx that is later than the timing t2 at which the traction control ends). This second situation is a case where the OFF manipulation of the acceleration pedal 24 performed by the driver is delayed when the vehicle 12 has slipped. In the second situation, the control of the drive force control apparatus 10 performed until the timing t2 is the same as in the first situation, and therefore a description thereof is omitted (the same is true for the third to seventh situations below).

When the slipping of the vehicle 12 has been eliminated at the timing t2, the drive force control apparatus 10 transitions from the traction control implementation mode to the post-operation processing, based on the mode signal MS of the TCS control apparatus 30 falling from [2] to [0]. At this timing t2, the steady drive force SD is higher than the internal drive force ID, and the filtered drive force FD is higher than the internal drive force ID. Therefore, upon comparing the values of the steady drive force SD, the filtered drive force FD, and the internal drive force ID at the initial stage of the timing t2, the drive force control apparatus 10 determines that condition (a) described above is established.

Accordingly, the drive force control apparatus 10 calculates a new internal drive force ID that gradually increases toward the filtered drive force FD from the internal drive force ID calculated during the traction control operation. That is, the target drive force MDF of the drive force control apparatus 10 gradually increases from the timing of the traction control operation.

Based on the OFF manipulation of the acceleration pedal 24 performed by the driver after the timing t2, the drive force control apparatus 10 calculates a steady drive force SD (requested drive force RD) that gradually decreases and calculates a filtered drive force FD that gently decreases in accordance with this steady drive force SD. Therefore, the steady drive force SD becomes less than the internal drive force ID (internal drive force ID≥steady drive force SD) at the timing ty. At this timing, the drive force control apparatus 10 determines that condition (b) described above is established, and performs control to maintain the internal drive force ID of that timing.

Then, at the timing t3 at which the internal drive force ID and the filtered drive force FD become matching (filtered drive force FD≤internal drive force ID), the drive force control apparatus 10 determines that condition (c) described above is established. Accordingly, at the timing t3, the drive force control apparatus 10 ends the post-operation processing and transitions to the normal travel control. The target drive force MDF is switched to the filtered drive force FD that decreases gradually from the internal drive force ID, and the vehicle 12 decelerates according to the filtered drive force FD.

In other words, when the OFF manipulation of the acceleration pedal 24 is delayed, the target drive force MDF becomes constant after rising slightly toward the filtered drive force FD. Accordingly, the vehicle 12 experiences a drive force change corresponding to the delay of the OFF manipulation of the acceleration pedal 24 performed by the driver, thereby reducing the discomfort of the driver. Furthermore, after the drive force has increased slightly, the drive force of the vehicle 12 decreases smoothly, and therefore it is possible to avoid disturbances in the behavior of the vehicle 12.

[Third Situation]

Figure 6:
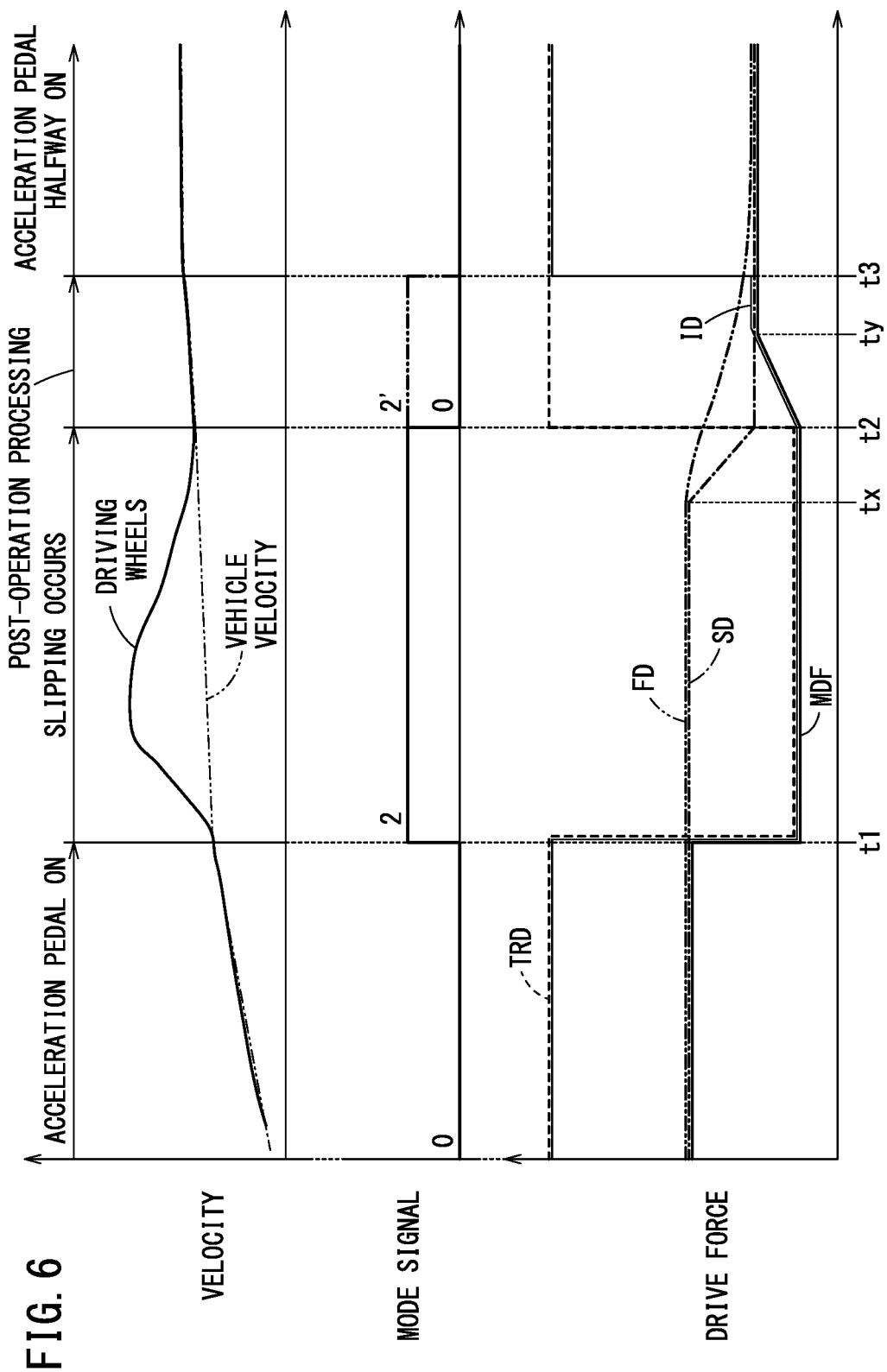
FIG. 6 is a time chart showing changes in control content and drive force in a third situation.

In the third situation, as shown in FIG. 6, a pattern is envisioned in which the driver eases up on the acceleration pedal 24 (acceleration manipulation approximately halfway ON) while slipping is occurring (timing tx that is somewhat earlier than the timing t2 at which the traction control ends).

When the slipping of the vehicle 12 has been eliminated at the timing t2, the drive force control apparatus 10 transitions from the traction control implementation mode to the post-operation processing, based on the mode signal MS of the TCS control apparatus 30 falling from [2] to [0]. In the third situation, due to the acceleration manipulation being approximately halfway ON, at the timing t2, the steady drive force SD and the filtered drive force FD are both higher than the internal drive force ID. Therefore, upon comparing the values of the steady drive force SD, the filtered drive force FD, and the internal drive force ID at the initial stage of the timing t2, the drive force control apparatus 10 determines that condition (a) described above is established.

Accordingly, in the same manner as in the second situation, the drive force control apparatus 10 calculates a new internal drive force ID that gradually increases toward the filtered drive force FD from the internal drive force ID calculated during the traction control operation. That is, the target drive force MDF gradually increases from the timing of the traction control operation.

At the timing ty, which is a certain time after the timing t2, the steady drive force SD (requested drive force RD) occurring when the accelerator is approximately halfway ON and the internal drive force ID match (internal drive force ID≥steady drive force SD). At this timing, the drive force control apparatus 10 determines that condition (b) described above is established, and performs control to maintain the internal drive force ID of that timing.

Then, at the timing t3 at which the internal drive force ID and the filtered drive force FD become matching (filtered drive force FD≤internal drive force ID), the drive force control apparatus 10 determines that condition (c) described above is established. Accordingly, at the timing t3, the drive force control apparatus 10 ends the post-operation processing and transitions to the normal travel control. The target drive force MDF is switched to the filtered drive force FD corresponding to the accelerator being approximately halfway ON, and the vehicle 12 travels according to the filtered drive force FD.

In other words, when the ON manipulation of the accelerator is performed approximately halfway, the target drive force MDF rises slightly toward the filtered drive force FD and then becomes a drive force equal to the filtered drive force FD. Accordingly, the vehicle 12 experiences a drive force change corresponding to the manipulation performed by the driver, thereby reducing the discomfort of the driver and making it possible to avoid disturbances in the behavior of the vehicle 12.

[Fourth Situation]

Figure 7:
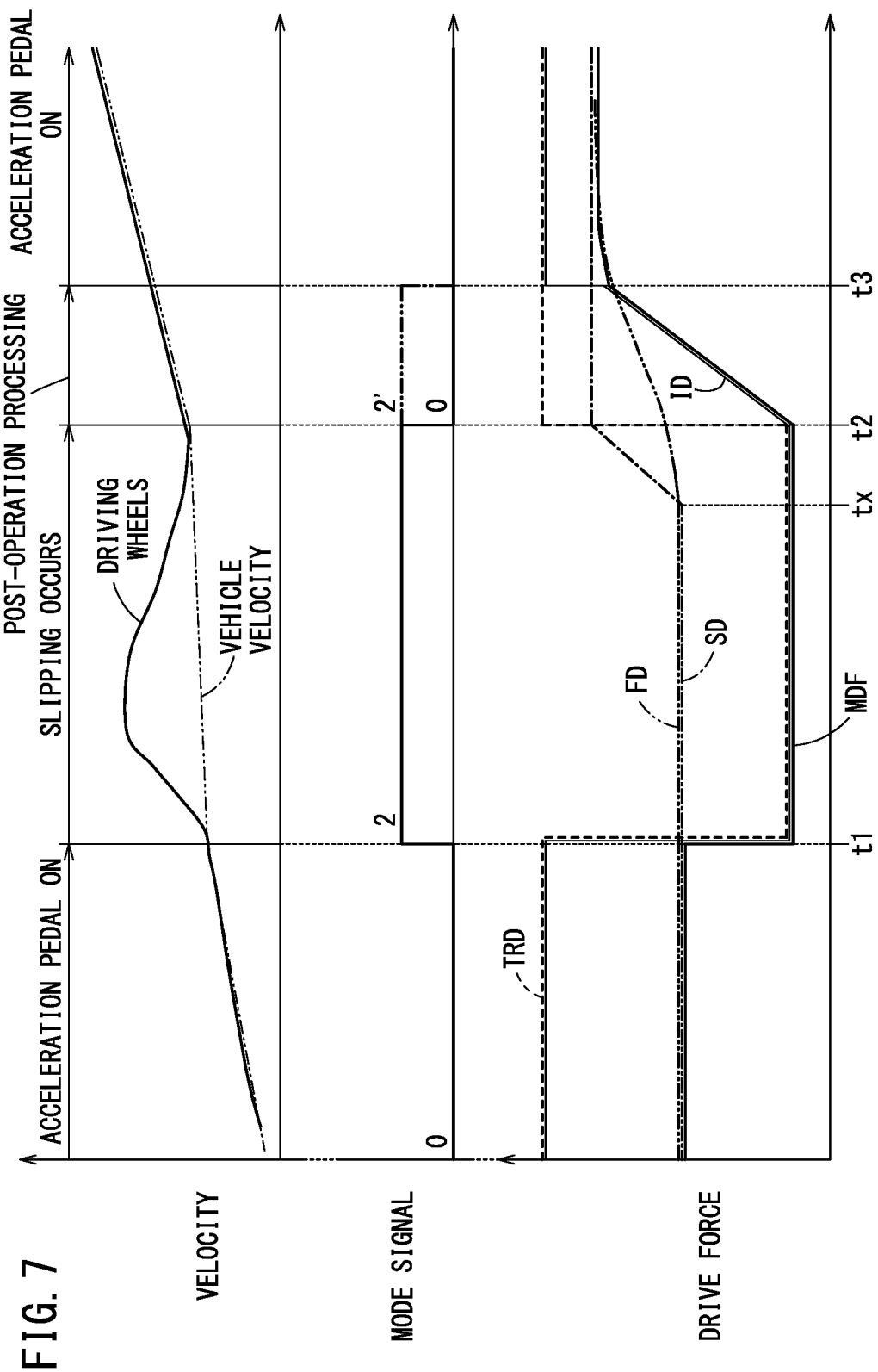
FIG. 7 is a time chart showing changes in control content and drive force in a fourth situation.

In the fourth situation, as shown in FIG. 7, a pattern is envisioned in which the driver strengthens the accelerator ON manipulation when slipping occurs (the timing tx that is later than the timing t2 at which the traction control ends).

When the slipping of the vehicle 12 has been eliminated at the timing t2, the drive force control apparatus 10 transitions from the traction control implementation mode to the post-operation processing, based on the mode signal MS of the TCS control apparatus 30 falling from [2] to [0]. In the fourth situation, due to the accelerator ON manipulation being strengthened, at the timing t2, the steady drive force SD and the filtered drive force FD are higher than the internal drive force ID. Therefore, upon comparing the values of the steady drive force SD, the filtered drive force FD, and the internal drive force ID at the initial stage of the timing t2, the drive force control apparatus 10 determines that condition (a) described above is established.

Accordingly, the drive force control apparatus 10 calculates a new internal drive force ID that gradually increases toward the filtered drive force FD from the internal drive force ID calculated during the traction control operation. That is, the target drive force MDF gradually increases from the timing of the traction control operation.

Furthermore, the filtered drive force FD used when the accelerator ON manipulation is strengthened gradually increases relative to the steady drive force SD, the gradually increasing internal drive force ID and the filtered drive force FD become matching (filtered drive force FD≤internal drive force ID) first at the timing t3.

At the timing t3, the drive force control apparatus 10 determines that condition (c) described above is established, ends the post-operation processing, and transitions to the normal travel control. The target drive force MDF is switched to the filtered drive force FD that increases gradually from the internal drive force ID. In other words, when the accelerator ON manipulation is strengthened, the target drive force MDF is switched to the filtered drive force FD, which gradually increases, after rising in accordance with the rate processing of the internal drive force ID. Therefore, in this case as well, the vehicle 12 performs a drive force change corresponding to the manipulation performed by the driver, thereby reducing the discomfort of the driver and making it possible to avoid disturbances in the behavior of the vehicle 12.

Figure 8:
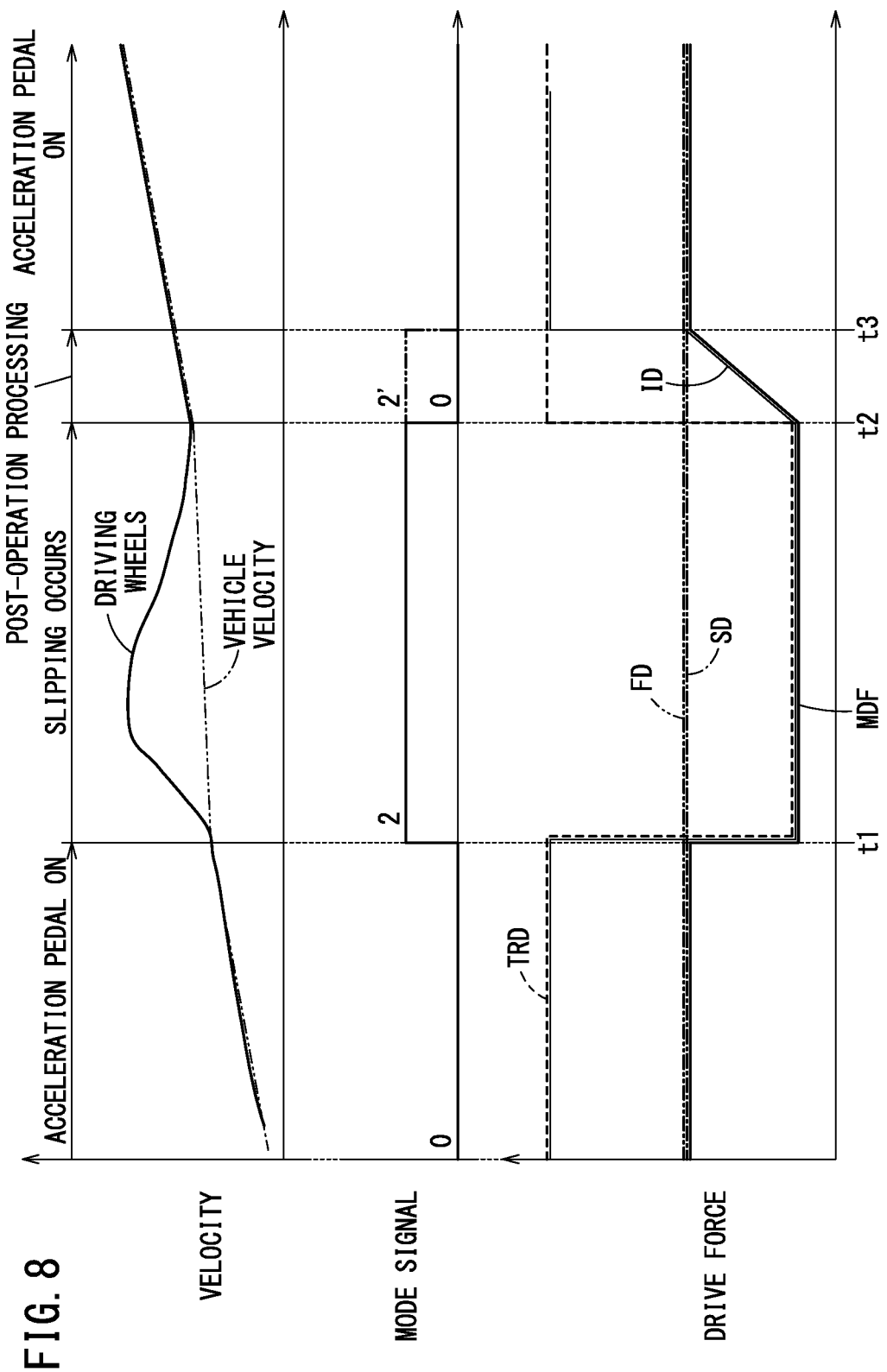
FIG. 8 is a time chart showing changes in control content and drive force in a fifth situation.

[Fifth Situation] In the fifth situation, as shown in FIG. 8, a pattern is envisioned in which the driver maintains the accelerator ON manipulation (the steady drive force SD remains substantially constant) when slipping occurs.

When the slipping of the vehicle 12 has been eliminated at the timing t2, the drive force control apparatus 10 transitions from the traction control implementation mode to the post-operation processing, based on the mode signal MS of the TCS control apparatus 30 falling from [2] to [0]. In the fifth situation, due to maintaining the accelerator ON manipulation, at the timing t2, the steady drive force SD and the filtered drive force FD are higher than the internal drive force ID. Therefore, upon comparing the values of the steady drive force SD, the filtered drive force FD, and the internal drive force ID at the initial stage of the timing t2, the drive force control apparatus 10 determines that condition (a) described above is established.

Accordingly, the drive force control apparatus 10 calculates a new internal drive force ID that gradually increases toward the filtered drive force FD from the internal drive force ID calculated during the traction control operation. That is, the target drive force MDF gradually increases from the timing of the traction control operation. Then, since the filtered drive force FD used when the accelerator ON manipulation is maintained matches the steady drive force SD, the gradually increasing internal drive force ID and the filtered drive force FD become matching (filtered drive force FD≤internal drive force ID) at the timing t3. At the timing t3, the drive force control apparatus 10 determines that condition (c) described above is established, ends the post-operation processing, and transitions to the normal travel control. The target drive force MDF is switched to the filtered drive force FD that increases gradually from the internal drive force ID. In other words, when the accelerator ON manipulation is maintained, the target drive force MDF is smoothly switched to the filtered drive force FD, which remains substantially constant, after rising in accordance with the rate processing of the internal drive force ID. Therefore, in this case as well, the vehicle 12 performs a drive force change corresponding to the manipulation performed by the driver, thereby reducing the discomfort of the driver and making it possible to avoid disturbances in the behavior of the vehicle 12.

[Sixth Situation]

Figure 9:
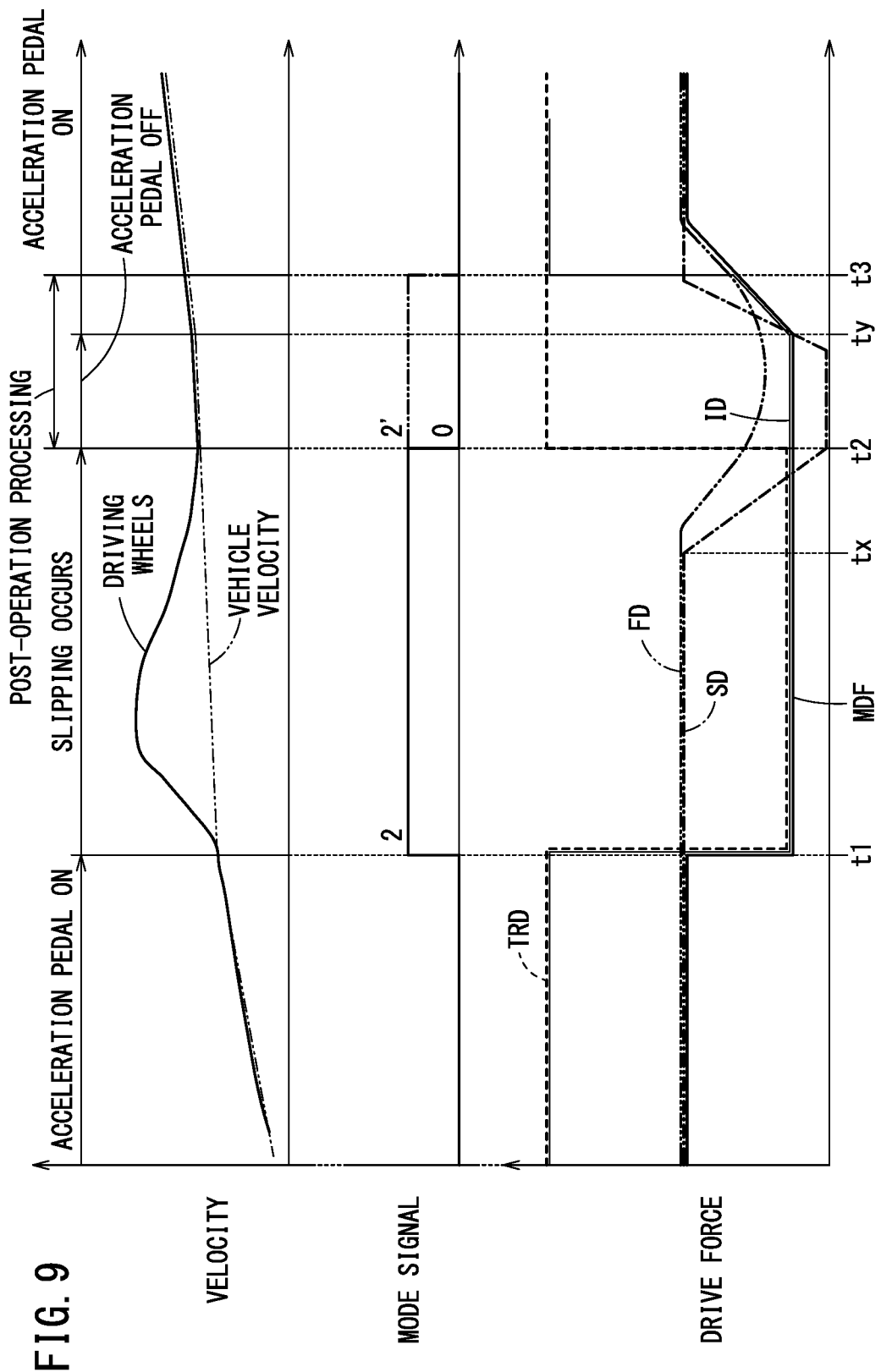
FIG. 9 is a time chart showing changes in control content and drive force in a sixth situation.

In the sixth situation, as shown in FIG. 9, a pattern is envisioned in which, when slipping occurs (the timing tx that is later than the timing t2 at which the traction control ends), the driver performs the accelerator OFF manipulation and then later performs the acceleration ON manipulation again.

When the slipping of the vehicle 12 has been eliminated at the timing t2, the drive force control apparatus 10 transitions from the traction control implementation mode to the post-operation processing, based on the mode signal MS of the TCS control apparatus 30 falling from [2] to [0]. At the timing t2, the steady drive force SD is lower than the internal drive force ID, and the filtered drive force FD is higher than the internal drive force ID. Therefore, upon comparing the values of the steady drive force SD, the filtered drive force FD, and the internal drive force ID at the initial stage of the timing t2, the drive force control apparatus 10 determines that condition (b) described above is established.

Essentially, the drive force control apparatus 10 performs a process to maintain the internal drive force ID (target drive force MDF) calculated during the implementation of the traction control system. Then, when the accelerator ON manipulation is performed at the timing ty, the steady drive force SD increases and the filtered drive force FD then increases as well with a delay relative to the steady drive force SD. Therefore, the drive force control apparatus 10 determines there to be a state in which, at the timing ty, the steady drive force SD exceeds the internal drive force ID and the internal drive force ID is less than the filtered drive force FD, in other words, that condition (a) described above is established.

Accordingly, the drive force control apparatus 10 calculates a new internal drive force ID that gradually increases toward the filtered drive force FD from the internal drive force ID that was kept constant. Then, the filtered drive force FD used when the accelerator ON manipulation was performed increases more slowly than the steady drive force SD, and therefore the gradually increasing internal drive force ID comes to match the filtered drive force FD (filtered drive force FD≤internal drive force ID) at the timing t3.

At the timing t3, the drive force control apparatus 10 determines that condition (c) described above is established, ends the post-operation processing, and transitions to the normal travel control. The target drive force MDF is switched to the filtered drive force FD from the internal drive force ID, and increases in accordance with the filtered drive force FD. In other words, when the accelerator ON manipulation is performed after the acceleration OFF manipulation, the target drive force MDF increases gradually according to the rate processing after being kept substantially constant, and is then smoothly switched to the filtered drive force FD that increases. Therefore, in this case as well, the vehicle 12 performs a drive force change corresponding to the manipulation performed by the driver, thereby reducing the discomfort of the driver and making it possible to avoid disturbances in the behavior of the vehicle 12.

[Seventh Situation]

Figure 10:
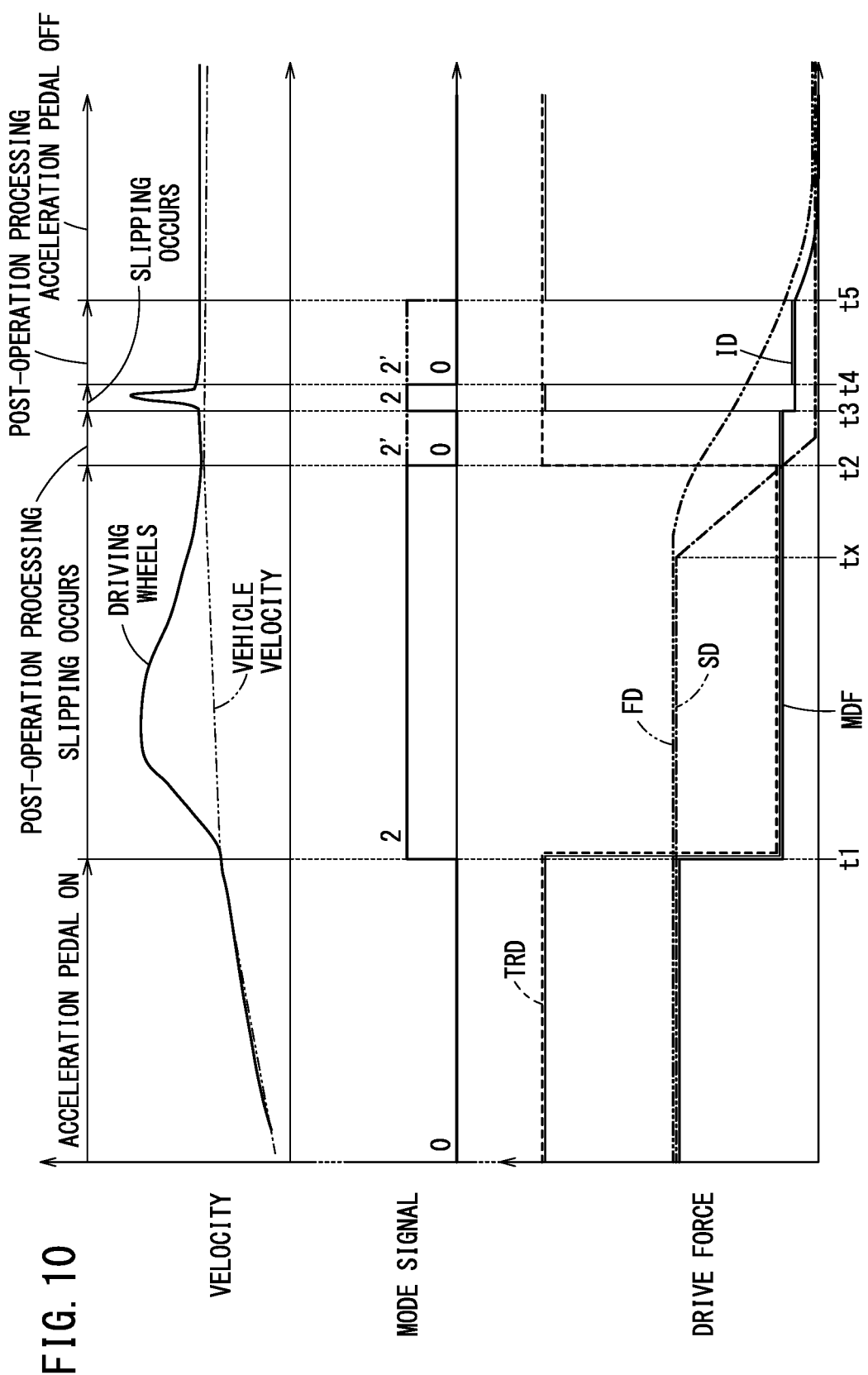
FIG. 10 is a time chart showing changes in control content and drive force in a seventh situation.

In the seventh situation, as shown in FIG. 10, a pattern is envisioned in which slipping occurs again during the post-operation processing performed after the initial slipping has ended (i.e. at a timing not long after the end of the initial slipping). It is assumed that the driver performs the accelerator OFF manipulation during the occurrence of the initial slipping (the timing tx somewhat earlier than the timing t2 at which the traction control ends).

In this case, at the timing t2 when the initial slipping has been eliminated, the drive force control apparatus 10 transitions from the traction control implementation mode to the post-operation processing, based on the mode signal MS of the TCS control apparatus 30 falling from [2] to [0]. At the timing t2, the steady drive force SD is lower than the internal drive force ID and the filtered drive force FD is higher than the internal drive force ID. Therefore, upon comparing the values of the steady drive force SD, the filtered drive force FD, and the internal drive force ID at the initial stage of the timing t2, the drive force control apparatus 10 determines that condition (b) described above is established.

Essentially, the drive force control apparatus 10 performs a process to maintain the internal drive force ID (target drive force MDF) calculated during the implementation of the traction control system. Then, when slipping occurs again at the timing t3, the drive force control apparatus 10 prioritizes the traction control and switches from the post-operation processing to the behavior stabilization control. That is, the drive force control apparatus 10 outputs the internal drive force ID based on the traction requested drive force TRD received from the TCS control apparatus 30, as the target drive force MDF. Since the second slipping occurs at a stage at which the drive force of the vehicle 12 is lower than when the initial slipping occurred, the traction requested drive force TRD (internal drive force ID) has a lower value than (or the same value as) the internal drive force ID being currently maintained.

Therefore, the drive force control apparatus 10 outputs an internal drive force ID that is lower than (or the same as) the internal drive force ID before the timing t3, as the target drive force MDF. Furthermore, the second slipping is eliminated in a short time due to the drive force being lower, and the post-operation processing is transitioned to again at the timing t4.

At the timing t4 in FIG. 10, the steady drive force SD is lower than the internal drive force ID and the filtered drive force FD is higher than the internal drive force ID.

Therefore, the drive force control apparatus 10 determines that condition (b) is established and performs processing to maintain the internal drive force ID (target drive force MDF).

After this, at the timing t5 when the internal drive force ID and the filtered drive force FD become matching, the drive force control apparatus 10 determines that condition (c) described above is established and transitions to the normal travel control. That is, the target drive force MDF is switched to the filtered drive force FD that gradually decreases from the internal drive force ID, and the vehicle 12 decelerates according to the filtered drive force FD.

In other words, in a case where slipping occurs again during the post-operation processing, the target drive force MDF is smoothly switched to the traction requested drive force TRD each time slipping occurs, by prioritizing the implementation of the traction control. In this case as well, the vehicle 12 performs a drive force change corresponding to the manipulation performed by the driver, thereby reducing the discomfort of the driver and making it possible to avoid disturbances in the behavior of the vehicle 12.

[Eighth Situation]

Figure 11:
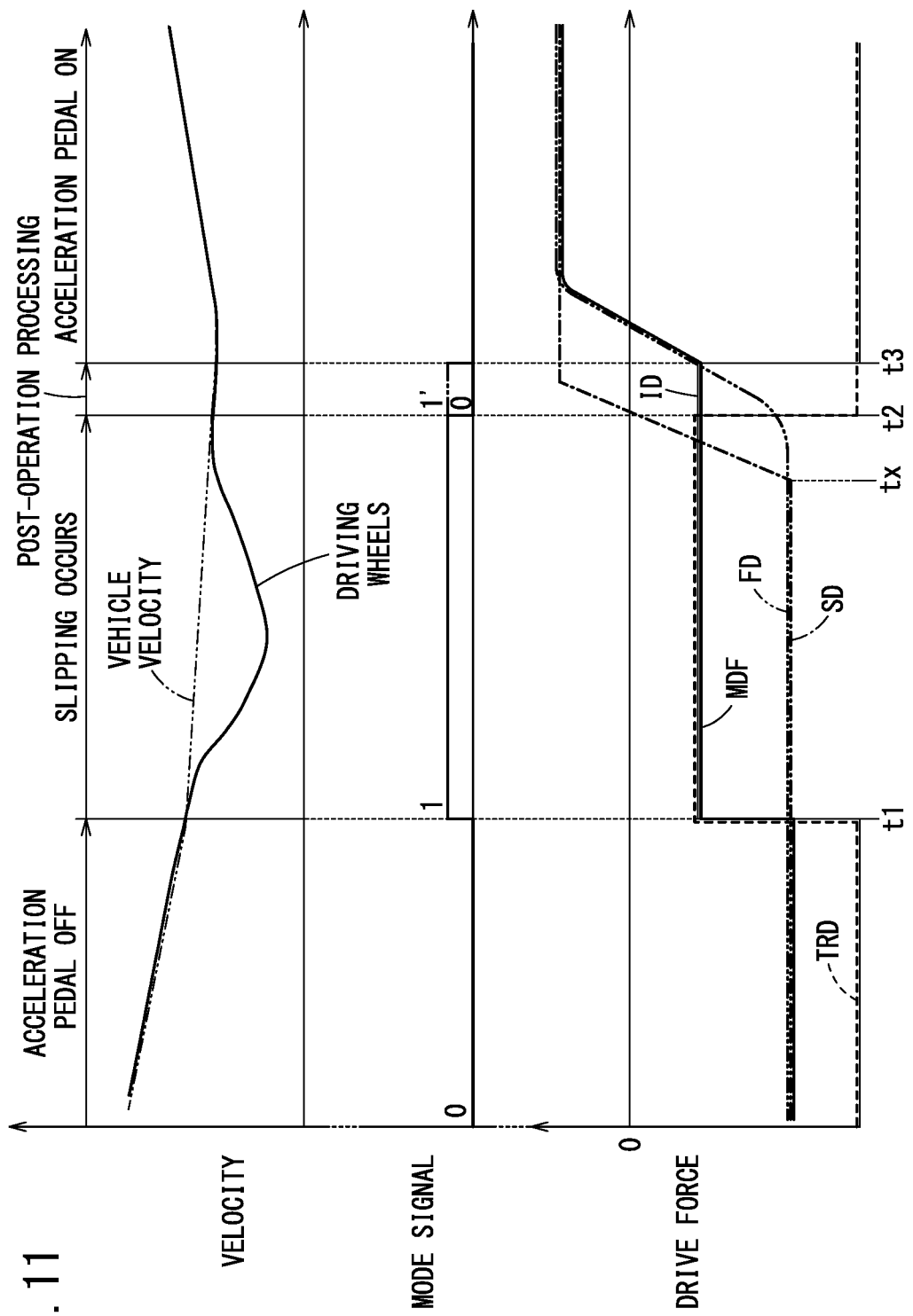
FIG. 11 is a time chart showing changes in control content and drive force in an eighth situation.

In the eighth situation, as shown in FIG. 11, a pattern is envisioned in which slipping occurs during deceleration of the vehicle 12. In this case, the TCS control apparatus 30 implements the engine drag control described above.

Furthermore, in the eighth situation, a case is envisioned in which the driver performs the accelerator ON manipulation when the slipping occurs (the timing tx that is somewhat earlier than the timing t2 at which the engine drag control ends). This eighth situation is the action most likely to be taken by the driver when the vehicle 12 slips during deceleration.

At the timing t1, when slipping occurs during deceleration of the vehicle 12, the TCS control apparatus 30 outputs [1] as the mode signal MS to the drive force control apparatus 10, in order to implement the engine drag control. The slipping during deceleration of the vehicle 12 is a state in which the rotational velocity of the driving wheels 16 is less than the rotational velocity of the driven wheels 18 (vehicle velocity).

At this time, along with receiving the mode signal MS, the drive force control apparatus 10 also receives the traction requested drive force TRD, which has a larger drive force value than the filtered drive force FD, from the TCS control apparatus 30. Based on this traction requested drive force TRD, the internal drive force generating section 46 calculates the internal drive force ID and implements the engine drag control to output this internal drive force ID as the target drive force MDF. Due to this, during operation of the engine drag control, the vehicle 12 tries to quickly eliminate the slipping by increasing the rotation of the driving wheels 16.

When the slipping of the vehicle 12 is eliminated at the timing t2, the TCS control apparatus 30 outputs [0] as the mode signal MS, which ends the engine drag control, to the drive force control apparatus 10. The drive force control apparatus 10 transitions from the engine drag control implementation mode to the post-operation processing, based on the mode signal MS falling from [1] to [0]. Then, at this timing t2, the steady drive force SD is higher than the internal drive force ID, and the filtered drive force FD is lower than the internal drive force ID.

Therefore, upon comparing the values of the steady drive force SD, the filtered drive force FD, and the internal drive force ID at the initial stage of the timing t2, the drive force control apparatus 10 determines that condition (e) described above is established. Accordingly, the drive force control apparatus 10 performs processing to maintain the internal drive force ID calculated during the engine drag control operation. That is, the drive force control apparatus 10 outputs an internal drive force ID that is the same as the internal drive force ID at the timing when the engine drag control ends, as the target drive force MDF.

Due to the driver performing the ON manipulation of the acceleration pedal 24, the internal drive force ID continues to be maintained until the internal drive force ID comes to match the filtered drive force FD that gradually increases. At the timing t3 when the internal drive force ID and the filtered drive force FD become matching, the drive force control apparatus 10 determines that condition (f) described above is established. Accordingly, at this timing t3, the drive force control apparatus 10 ends the post-operation processing and transitions to the normal travel control. That is, the target drive force MDF is switched to the filtered drive force FD that gradually increases from the internal drive force ID, and the vehicle 12 accelerates according to the filtered drive force FD.

In other words, the target drive force MDF does not immediately return (drop) to the filtered drive force FD when the engine drag control operation ends. Accordingly, the drive force control apparatus 10 causes the drive force of the vehicle 12 to increase smoothly, thereby making it possible to avoid disturbances in the behavior of the vehicle 12.

[Ninth Situation]

In the ninth situation, as shown in FIG. 12, a pattern is envisioned in which the driver maintains the accelerator OFF manipulation during slipping that occurs during deceleration of the vehicle 12. In the ninth situation, the control of the drive force control apparatus 10 until the timing t2 is the same as in the eighth situation, and therefore a description thereof is omitted (the same is true for the tenth and eleventh situations below).

When the slipping of the vehicle 12 is eliminated at the timing t2, the drive force control apparatus 10 transitions from the engine drag control implementation mode to the post-operation processing, based on the mode signal MS of the TCS control apparatus 30 falling from [1] to [0]. In the ninth situation, due to the accelerator OFF manipulation is maintained, at the timing t2, the steady drive force SD and the filtered drive force FD are both lower than the internal drive force ID. Therefore, the drive force control apparatus 10 compares the values among the steady drive force SD, the filtered drive force FD, and the internal drive force ID at the initial stage of the timing t2, and determines that condition (d) is established.

Accordingly, the drive force control apparatus 10 calculates a new internal drive force ID that gradually decreases toward the filtered drive force FD from the internal drive force ID that was calculated during the engine drag control operation. That is, the target drive force MDF also gradually decreases from the timing of the engine drag control operation. Then, due to the filtered drive force FD occurring when the accelerator OFF manipulation was maintained coming to match the steady drive force SD, the gradually decreasing internal drive force ID comes to match the filtered drive force FD (filtered drive force FD≥internal drive force ID) at the timing t3.

At the timing t3, the drive force control apparatus 10 determines that condition (f) described above is established, ends the post-operation processing, and transitions to the normal travel control. The target drive force MDF is switched to the filtered drive force FD from the internal drive force ID. In other words, when the accelerator OFF manipulation is maintained, the target drive force MDF is smoothly switched to the filtered drive force FD, which remains substantially constant, after decreasing in accordance with the rate processing of the internal drive force ID. Accordingly, in this case as well, the vehicle 12 performs a drive force change corresponding to the manipulation performed by the driver, thereby reducing the discomfort of the driver and making it possible to avoid disturbances in the behavior of the vehicle 12.

[Tenth Situation]

Figure 13:
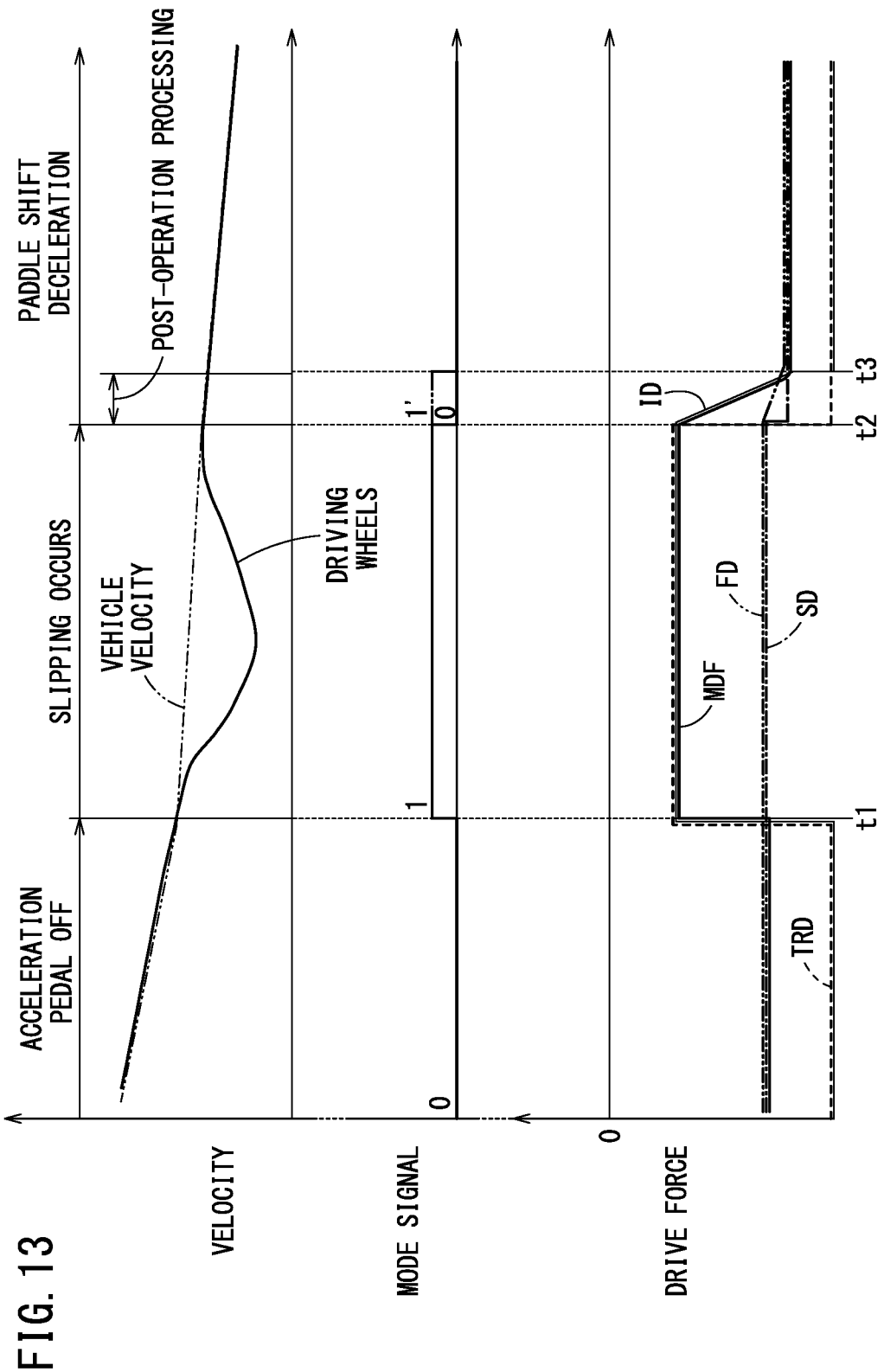
FIG. 13 is a time chart showing changes in control content and drive force in a tenth situation.

In the tenth situation, as shown in FIG. 13, a pattern is envisioned in which the driver performs a deceleration manipulation on the paddle shift apparatus of the manipulation apparatus 20, near the timing at which the engine drag control operation ends after slipping has occurred. In this case, it is envisioned that the driver continues the OFF manipulation of the acceleration pedal 24.

When the slipping of the vehicle 12 is eliminated at the timing t2, the drive force control apparatus 10 transitions from the engine drag control implementation mode to the post-operation processing, based on the mode signal MS of the TCS control apparatus 30 falling from [1] to [0]. In the tenth situation, due to the deceleration manipulation of the paddle shift apparatus, the vehicle 12 decelerates (experiences a decrease in drive force) more than in the case where only the OFF manipulation of the acceleration pedal 24 was performed. Accordingly, at the timing t2, the steady drive force SD decreases quickly, and the filtered drive force FD also decrease gradually in accordance with this decrease of the steady drive force SD. Naturally, the steady drive force SD and the filtered drive force FD both become lower than the internal drive force ID. Therefore, the drive force control apparatus 10 compares the values among the steady drive force SD, the filtered drive force FD, and the internal drive force ID at the initial stage of the timing t2, and determines that condition (d) is established.

Accordingly, the drive force control apparatus 10 calculates a new internal drive force ID that gradually decreases toward the filtered drive force FD from the internal drive force ID that was calculated during the engine drag control operation. The target drive force MDF also gradually decreases from the timing of the engine drag control operation. Then, at the timing t3, the internal drive force ID comes to match the gradually decreasing filtered drive force FD (filtered drive force FD≥internal drive force ID).

At the timing t3, the drive force control apparatus 10 determines that condition (f) described above is established, ends the post-operation processing, and transitions to the normal travel control. The target drive force MDF is switched to the filtered drive force FD from the internal drive force ID. In other words, when the deceleration manipulation of the paddle shift apparatus is performed during the engine drag control operation, the target drive force MDF is smoothly switched to the filtered drive force FD, which gradually decreases, after decreasing in accordance with the rate processing of the internal drive force ID. Accordingly, in this case as well, the vehicle 12 performs a drive force change corresponding to the manipulation performed by the driver, thereby reducing the discomfort of the driver and making it possible to avoid disturbances in the behavior of the vehicle 12.

[Eleventh Situation]

Figure 14:
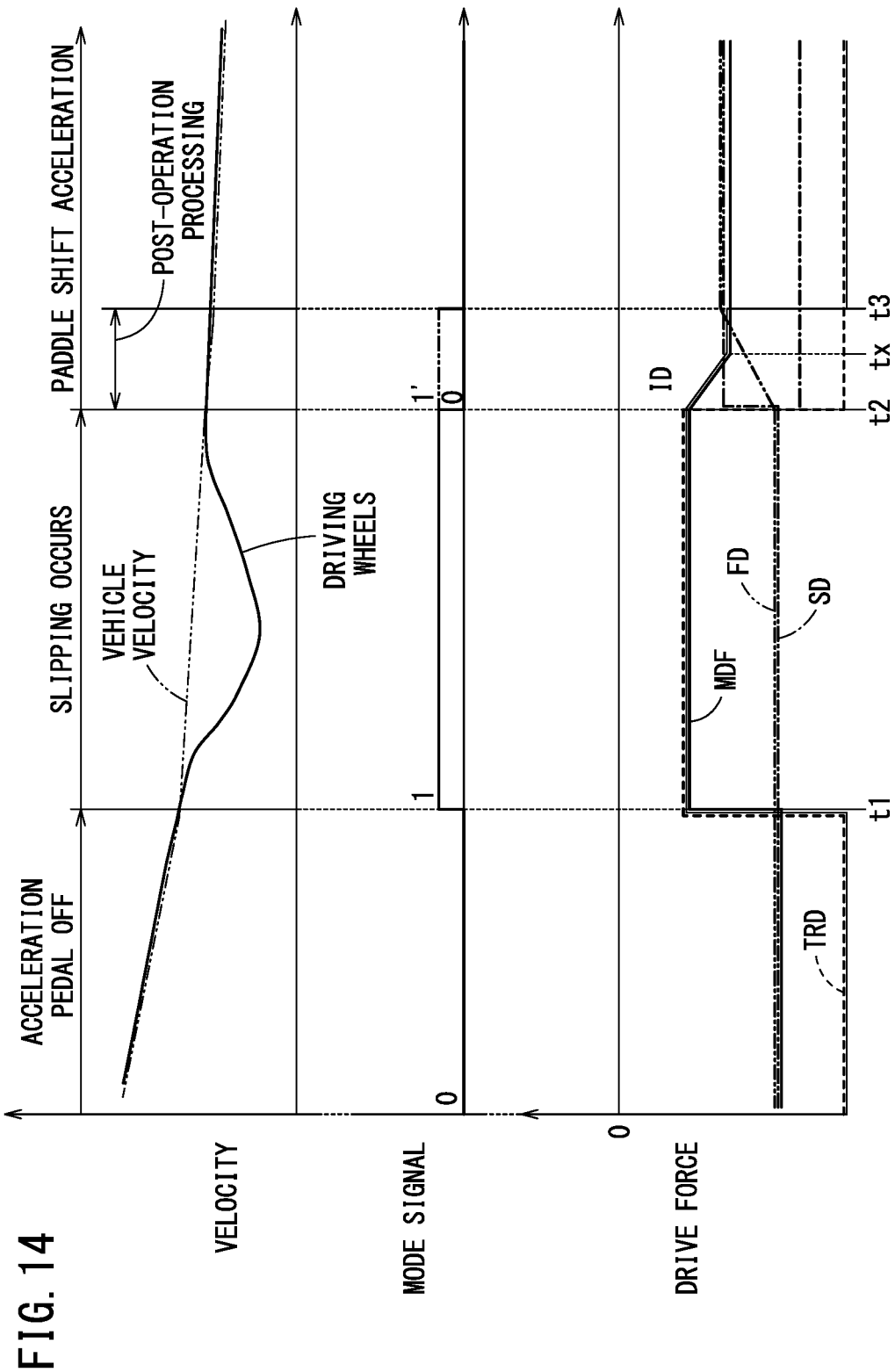
FIG. 14 is a time chart showing changes in control content and drive force in an eleventh situation.

In the eleventh situation, as shown in FIG. 14, a pattern is envisioned in which the driver performs an acceleration manipulation on the paddle shift apparatus of the manipulation apparatus 20 (a manipulation opposite the manipulation made in the tenth situation), near the timing at which the engine drag control operation ends after slipping has occurred. In this case, it is envisioned that the driver continues the OFF manipulation of the acceleration pedal 24.

When the slipping of the vehicle 12 is eliminated at the timing t2, the drive force control apparatus 10 transitions from the engine drag control implementation mode to the post-operation processing, based on the mode signal MS of the TCS control apparatus 30 falling from [1] to [0]. In the eleventh situation, due to the acceleration manipulation of the paddle shift apparatus, the vehicle 12 weakens the engine brake force (braking force). Therefore, the steady drive force SD increases slightly more (by an amount that does not cause the internal drive force ID to be exceeded) toward the acceleration side than in the case where only the OFF manipulation of the acceleration pedal 24 was performed, and the filtered drive force FD also increases gradually in accordance with this increase of the steady drive force SD.

Therefore, at the initial stage of the post-operation processing after the timing t2, the steady drive force SD and the filtered drive force FD are both lower than the internal drive force ID, and so the drive force control apparatus 10 compares the values among the steady drive force SD, the filtered drive force FD, and the internal drive force ID, and determines that condition (d) is established. Accordingly, the drive force control apparatus 10 calculates a new internal drive force ID that gradually decreases toward the filtered drive force FD from the internal drive force ID that was calculated during the engine drag control operation. The target drive force MDF also gradually decreases from the timing of the engine drag control operation.

At the timing tx, at which the internal drive force ID is gradually decreasing over time, a state is realized in which the internal drive force ID matches the steady drive force SD and is greater than the filtered drive force FD. Accordingly, the drive force control apparatus 10 determines that condition (e) is established and performs control to maintain the internal drive force ID.

After this, at the timing t3, the gradually decreasing filtered drive force FD comes to match the internal drive force ID (filtered drive force FD≥internal drive force ID), and so the drive force control apparatus 10 determines that condition (f) is established, ends the post-operation processing, and transitions to the normal travel control. The target drive force MDF is switched to the filtered drive force FD from the internal drive force ID.

In other words, when the acceleration manipulation of the paddle shift apparatus is performed during the engine drag control operation, the target drive force MDF is temporarily maintained (for s short time) after decreasing in accordance with the rate processing of the internal drive force ID, and is then switched to the filtered drive force FD that gradually increases in accordance with the acceleration manipulation. Accordingly, in this case as well, the vehicle 12 performs a drive force change corresponding to the manipulation performed by the driver, thereby reducing the discomfort of the driver and making it possible to avoid disturbances in the behavior of the vehicle 12.

The present invention is not limited to the above-described embodiments, and various alterations can be adopted therein without departing from the scope of the present invention. For example, even when the TCS control apparatus 30 stops unintentionally due to a malfunction or the like during operation of the traction control system, the drive force control apparatus 10 can transition to the post-operation processing due to the mode signal MS dropping from [1] or [2] to [0]. Therefore, even when the TCS control apparatus 30 stops, the drive force control apparatus 10 can smoothly adjust the drive force of the vehicle 12 and suppress disturbances in the behavior of the vehicle 12.

As another example, the drive force control section 36 may use the internal drive force ID calculated earlier than the previous internal drive force ID, without using the internal drive force ID previously calculated by the internal drive force generating section 46, in the comparisons among each drive force.

The following is a record of the technical concepts and effects that can be understood from the embodiments described above.

A first aspect of the present invention is the drive force control apparatus, comprising a first drive force setting section (steady drive force calculating section 32) that sets a first drive force (steady drive force SD) based on manipulation of an acceleration pedal 24 or a requested drive force RD of the automated travel apparatus 22; a second drive force setting section (filter processing section 34) that sets a second drive force (filtered drive force FD) obtained by performing a filtering process on the first drive force; and the drive force control section 36 that has the first drive force and the second drive force input thereto, and sets a target drive force MDF; wherein the drive force control section 36: has the traction requested drive force TRD, which is a drive force requested by a traction control system (TCS control apparatus 30), input thereto, and during operation of the traction control system, calculates a third drive force (internal drive force ID) based on the traction requested drive force TRD and sets the third drive force as the target drive force MDF; implements post-operation processing after operation of the traction control system ends; and in the post-operation processing, calculates a new third drive force based on a large-small relationship among the first drive force, the second drive force, and the previously calculated third drive force, and sets the new third drive force as the target drive force MDF.

According to the above configuration, by setting the third drive force, which is calculated based on the large-small relationship among the first drive force, the second drive force, and the previously calculated third drive force, as the target drive force MDF, the drive force control apparatus 10 can simplify the computation and suppress increases in the size and cost of the apparatus. Furthermore, when transitioning from the operational end of the traction control system (TCS control apparatus 30) to the normal control, the drive force control apparatus 10 can output a suitable target drive force MDF according to the state of the drive force of the vehicle 12. As a result, the drive force control apparatus 10 can suppress disturbances in the behavior of the vehicle 12 and reduce the discomfort of the driver. Furthermore, by being provided separately from the traction control system, even when the traction control system stops due to a malfunction or the like, the drive force control apparatus 10 can easily set the target drive force MDF through the post-operation processing and restrict disturbances in the behavior of the vehicle 12.

During implementation of the post-operation processing, the drive force control section 36 performs maintenance processing to maintain the previously calculated third drive force (internal drive force ID) or rate processing causing the previously calculated third drive force to gradually converge toward the second drive force. In this way, by maintaining or performing the rate processing on the third drive force after the operational end of the traction control system, the drive force control apparatus 10 can favorably smooth the change in the drive force occurring when switching the target drive force MDF from the third drive force to the second drive force (filtered drive force FD).

If the previously calculated third drive force (internal drive force ID) has the same value as the first drive force (steady drive force SD), or if the previously calculated third drive force has a value between the first drive force and the second drive force, the maintenance processing is continued until the new third drive force matches the second drive force. In this way, by maintaining the target drive force MDF (third drive force) until it matches second drive force (filtered drive force FD) in the post-operation processing, the drive force control apparatus 10 can further suppress the discomfort of the driver and disturbances in the behavior of the vehicle 12, and smoothly switch the drive force.

With the traction control system, drive force reduction control is implemented if a rotational velocity of the driving wheel 16 is greater than the vehicle velocity of the vehicle 12 by a prescribed amount or more, and drive force increase control is implemented if the rotational velocity of the driving wheel 16 is less than the vehicle velocity by a prescribed amount or more; and the drive force control apparatus 10 has the traction requested drive force TRD input thereto in the drive force reduction control, the traction requested drive force being the drive force value lower than the requested drive force RD, and has the traction requested drive force TRD input thereto in the drive force increase control, the traction requested drive force being the drive force value higher than the requested drive force RD. Due to this, the drive force control apparatus 10 can favorably calculate the third drive force (target drive force MDF) based on the respective traction requested drive forces TRD of the drive force reduction control and the drive force increase control.

In the post-operation processing after operation of the drive force reduction control ends, if the previously calculated third drive force (internal drive force ID) is less than the first drive force (steady drive force SD) and the second drive force (filtered drive force FD), the drive force control apparatus 10 continues the rate processing until the new third drive force matches the first drive force or the second drive force. Due to this, in the post-operation processing after the operational end of the drive force reduction control, the drive force control apparatus 10 can further suppress the discomfort of the driver and disturbances in the behavior of the vehicle 12.

In the post-operation processing after operation of the drive force reduction control ends, if the previously calculated third drive force (internal drive force ID) is greater than or equal to the second drive force (filtered rive force FD), the drive force control apparatus 10 ends the post-operation processing. Due to this, when the post-operation processing performed after the operational end of the drive force reduction control ends, the drive force control apparatus 10 can smoothly switch the target drive force MDF from the third drive force to the second drive force.

In the post-operation processing after operation of the drive force increase control ends, if the previously calculated third drive force (internal drive force ID) is greater than the first drive force (steady drive force SD) and the second drive force (filtered drive force FD), the drive force control apparatus 10 continues the rate processing until the new third drive force matches the first drive force or the second drive force. Due to this, in the post-operation processing after operation of the drive force increase control ends, the drive force control apparatus 10 can further suppress the discomfort of the driver and disturbances in the behavior of the vehicle 12.

In the post-operation processing after operation of the drive force increase control ends, if the previously calculated third drive force (internal drive force ID) is less than or equal to the second drive force (filtered drive force FD), the drive force control apparatus 10 ends the post-operation processing. Due to this, when the post-operation processing performed after the operational end of the drive force increase control ends, the drive force control apparatus 10 can smoothly switch the target drive force MDF from the third drive force to the second drive force.

A second aspect of the present invention is the drive force control apparatus comprising the drive force control section 36 that has a first drive force (steady drive force SD), a second drive force (filtered drive force FD) obtained by performing a filtering process on the first drive force, and a third drive force (internal drive force ID), which is calculated from a drive force requested based on a travel state, input thereto, and sets a target drive force MDF based on the first drive force, the second drive force, and the third drive force; wherein the drive force control section 36 implements post-operation processing after control for causing the third drive force to be the target drive force MDF ends; and in the post-operation processing, a new third drive force is calculated based on a large-small relationship among the first drive force, the second drive force, and the previously calculated third drive force, and the new third drive force is set as the target drive force MDF. According to the above configuration, by adjusting the drive force after the operational end of the traction control system using a simple configuration, the drive force control apparatus 10 can suppress the computational load, reduce the cost, and suppress disturbances in the behavior of the vehicle 12.

What is claimed is:

1. A drive force control apparatus comprising one or more processors that execute computer-executable instructions stored in a memory,
    wherein the one or more processors execute the computer-executable instructions to cause the drive force control apparatus to:
    set a first drive force based on manipulation of an acceleration pedal or a requested drive force of an automated travel apparatus;
    set a second drive force obtained by performing a filtering process on the first drive force; and
    have the first drive force and the second drive force input thereto, and set a target drive force,
    wherein the one or more processors cause the drive force control apparatus to:
    have a traction requested drive force, which is a drive force requested by a traction control system, input thereto, and during operation of the traction control system, calculate a third drive force based on the traction requested drive force and set the third drive force as the target drive force;
    implement post-operation processing after operation of the traction control system ends; and
    in the post-operation processing, calculate a new third drive force based on a large-small relationship among the first drive force, the second drive force, and the previously calculated third drive force, and set the new third drive force as the target drive force.

2. The drive force control apparatus according to claim 1, wherein during implementation of the post-operation processing, the one or more processors cause the drive force control apparatus to perform maintenance processing to maintain the previously calculated third drive force or rate processing causing the previously calculated third drive force to gradually converge toward the second drive force.

3. The drive force control apparatus according to claim 2, wherein if the previously calculated third drive force has a same value as the first drive force, or if the previously calculated third drive force has a value between the first drive force and the second drive force, the maintenance processing is continued until the new third drive force matches the second drive force.

4. The drive force control apparatus according to claim 2, wherein with the traction control system, drive force reduction control is implemented if a rotational velocity of a driving wheel is greater than a vehicle velocity of a vehicle by a prescribed amount or more, and drive force increase control is implemented if the rotational velocity of the driving wheel is less than the vehicle velocity by a prescribed amount or more; and
    the one or more processors cause the drive force control apparatus to have the traction requested drive force input thereto in the drive force reduction control, the traction requested drive force being a drive force value lower than the requested drive force, and have the traction requested drive force input thereto in the drive force increase control, the traction requested drive force being a drive force value higher than the requested drive force.

5. The drive force control apparatus according to claim 4, wherein in the post-operation processing after operation of the drive force reduction control ends, if the previously calculated third drive force is less than the first drive force and the second drive force, the one or more processors cause the drive force control apparatus to continue the rate processing until the new third drive force matches the first drive force or the second drive force.

6. The drive force control apparatus according to claim 4, wherein in the post-operation processing after operation of the drive force reduction control ends, if the previously calculated third drive force is greater than or equal to the second drive force, the one or more processors cause the drive force control apparatus to end the post-operation processing.

7. The drive force control apparatus according to claim 4, wherein in the post-operation processing after operation of the drive force increase control ends, if the previously calculated third drive force is greater than the first drive force and the second drive force, the one or more processors cause the drive force control apparatus to continue the rate processing until the new third drive force matches the first drive force or the second drive force.

8. The drive force control apparatus according to claim 4, wherein in the post-operation processing after operation of the drive force increase control ends, if the previously calculated third drive force is less than or equal to the second drive force, the one or more processors cause the drive force control apparatus to end the post-operation processing.

9. A drive force control apparatus comprising one or more processors that execute computer-executable instructions stored in a memory,
- wherein the one or more processors execute the computer-executable instructions to cause the drive force control apparatus to:
- have a first drive force, a second drive force obtained by performing a filtering process on the first drive force, and a third drive force, which is calculated from a drive force requested based on a travel state, input thereto, and set a target drive force based on the first drive force, the second drive force, and the third drive force,
- wherein the one or more processors cause the drive force control apparatus to implement post-operation processing after control for causing the third drive force to be the target drive force ends; and
- in the post-operation processing, a new third drive force is calculated based on a large-small relationship among the first drive force, the second drive force, and the previously calculated third drive force, and the new third drive force is set as the target drive force.

* * * * *